United States Patent
Fondeur et al.

(10) Patent No.: US 9,671,560 B1
(45) Date of Patent: Jun. 6, 2017

(54) ANGLED PERIODIC SEGMENTED WAVEGUIDE FOR SPOT SIZE CONVERSION WITH REDUCED RETURN LOSS

(71) Applicant: Lumentum Operations LLC, Milpitas, CA (US)

(72) Inventors: Barthelemy Fondeur, San Jose, CA (US); Hiroaki Yamada, San Jose, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/074,143

(22) Filed: Mar. 18, 2016

(51) Int. Cl.
*G02B 6/14* (2006.01)
*G02B 6/122* (2006.01)

(52) U.S. Cl.
CPC .............. *G02B 6/14* (2013.01); *G02B 6/1228* (2013.01)

(58) Field of Classification Search
CPC ........ G02B 6/10; G02B 6/12; G02B 6/12002; G02B 6/12016; G02B 6/12152; G02B 6/122; G02B 6/1228; G02B 6/14; G02B 2006/12195
See application file for complete search history.

(56) References Cited

U.S. PATENT DOCUMENTS

| | | | | |
|---|---|---|---|---|
| 5,577,141 A * | 11/1996 | Adar | ........................ | G02B 6/10 385/43 |
| 5,629,999 A * | 5/1997 | Henry | ....................... | G02B 6/10 385/27 |
| 5,745,618 A * | 4/1998 | Li | ....................... | G02B 6/12011 385/37 |
| 6,293,688 B1 * | 9/2001 | Deacon | ................ | G02B 6/1228 362/551 |
| 6,744,555 B2 * | 6/2004 | Galvanauskas | ....... | G02F 1/3132 359/332 |
| 6,813,419 B2 * | 11/2004 | Matsushima | ............ | G02B 6/10 385/124 |
| 6,931,180 B2 * | 8/2005 | Madsen | ............... | G02B 6/1228 385/49 |
| 6,934,446 B2 * | 8/2005 | Rasras | .................... | G02B 6/124 385/129 |
| 7,184,625 B2 * | 2/2007 | Gunn, III | ........... | G02B 6/12004 372/6 |
| 7,317,853 B2 * | 1/2008 | Laurent-Lund | ...... | G02B 6/1228 385/129 |

(Continued)

OTHER PUBLICATIONS

Weissman et al., "2-D Mode Tapering Via Tapered Channel Waveguide Segmentation", Electronics Letters, vol. 28, No. 16, Jul. 30, 1992, 3 pages.

(Continued)

*Primary Examiner* — John M Bedtelyon
(74) *Attorney, Agent, or Firm* — Harrity & Harrity, LLP

(57) ABSTRACT

A spot size converter may include a tapered periodic segmented waveguide (PSW). The tapered PSW may include a plurality of waveguide segments defined by a plurality of gaps between the plurality of waveguide segments. The plurality of gaps may be at one or more angles that are not substantially parallel to a direction of a width of the tapered PSW. The direction of the width of the tapered PSW may be substantially perpendicular to a direction in which light passes through the tapered PSW.

20 Claims, 22 Drawing Sheets

Reduced Return and Return Loss Peaks (e.g., 42 dB) with Wavelength Range (e.g., 1530 nm – 1620 nm)

Angled Gaps in Angled PSW 150 Reduce Return Loss as compared to Prior PSW 100

(56) References Cited

U.S. PATENT DOCUMENTS 7,356,226 B2 * 4/2008 Watanabe ............ G02B 6/1228
 385/131
7,440,650 B2 * 10/2008 Fondeur ............. G02B 6/12011
 385/16

OTHER PUBLICATIONS

Weissman et al., "Analysis of Periodically Segmented Waveguide Mode Expanders", Journal of Lightwave Technology, vol. 13, No. 10, Oct. 1995, 6 pages.

* cited by examiner

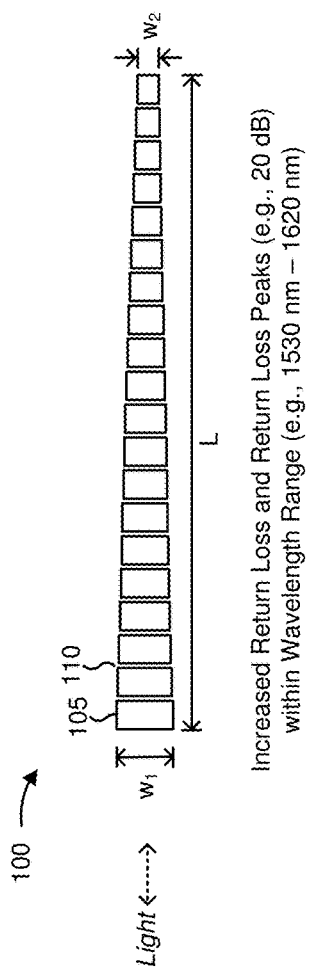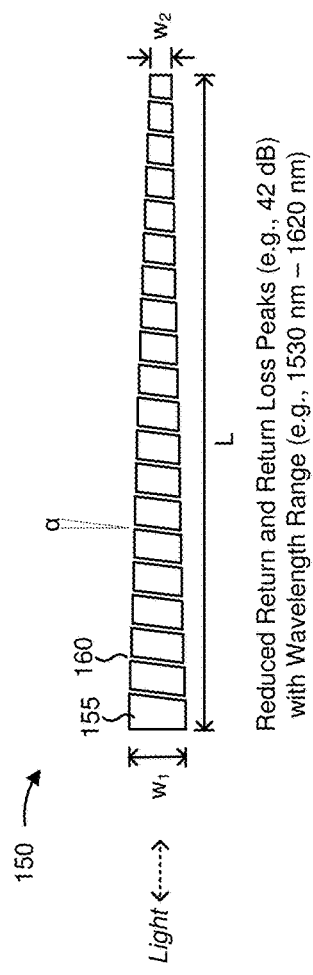

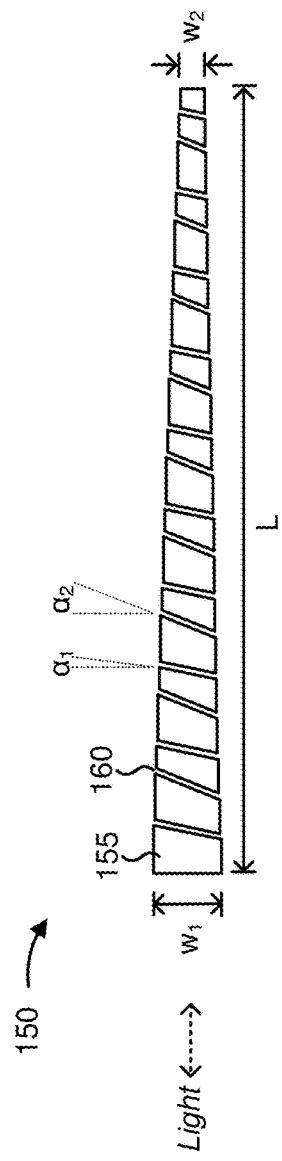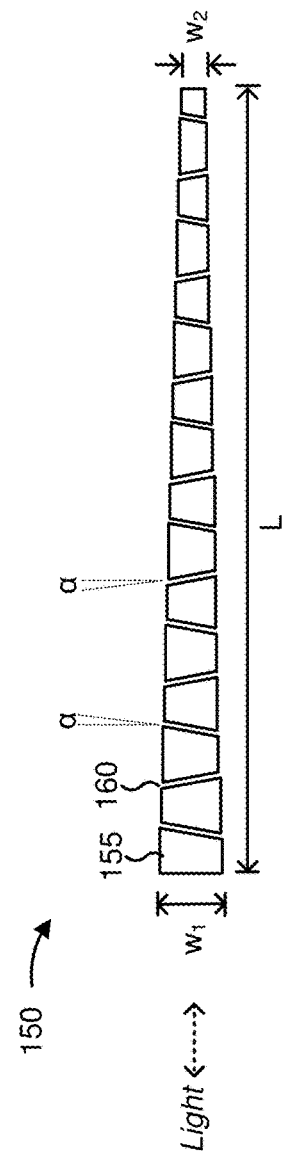

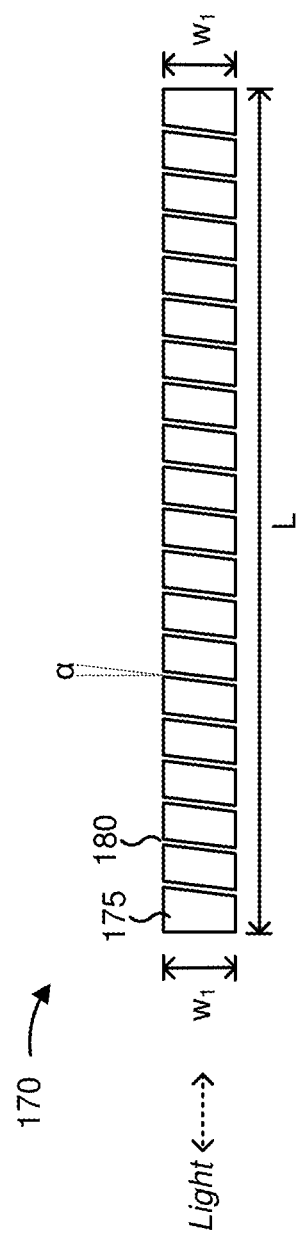

US 9,671,560 B1

ANGLED PERIODIC SEGMENTED WAVEGUIDE FOR SPOT SIZE CONVERSION WITH REDUCED RETURN LOSS

TECHNICAL FIELD

The present disclosure relates generally to spot size converters and, more particularly, to a spot size converter including an angled periodic segmented waveguide.

BACKGROUND

A spot size converter (sometimes referred to as a mode size converter or mode size adapter) is an optical device which is capable of expanding or contracting a mode of light in one or more spatial dimensions. For example, a spot size converter may expand a mode of light passing through a waveguide included in a planar lightwave circuit (PLC) (sometimes referred to as a photonic integrated circuit (PIC)) to a size which fits a mode of an optical fiber. Similarly, the spot size converter may contract a mode of light passing through the optical fiber to a size which fits the mode of the waveguide included in the PLC. Here, spot size conversion is needed in order to efficiently couple the PLC and the optical fiber such that an amount of loss caused by the coupling is reduced.

SUMMARY

According to some possible implementations, a spot size converter may include: a tapered periodic segmented waveguide (PSW), where the tapered PSW may include a plurality of waveguide segments defined by a plurality of gaps between the plurality of waveguide segments, where the plurality of gaps may be at one or more angles that are not substantially parallel to a direction of a width of the tapered PSW, where the direction of the width of the tapered PSW being substantially perpendicular to a direction in which light passes through the tapered PSW.

According to some possible implementations, a periodic segmented waveguide (PSW) may include: a plurality of waveguide segments defined by a plurality of gaps, where a gap, of the plurality of gaps, may be at a non-zero angle with respect to a direction of a width of the PSW, where the direction of the width of the PSW may be substantially perpendicular to a direction in which light is configured to pass via the PSW.

According to some possible implementations, an optical device may include: a periodic segmented waveguide (PSW) including a plurality of waveguide segments defined by a plurality of gaps, where a gap, of the plurality of gaps, may be at an angle that is less than ninety degrees or greater than ninety degrees with respect to a direction of a length of the PSW, where the direction of the length of the PSW may be substantially parallel to a direction in which light passes via the PSW for spot size conversion.

BRIEF DESCRIPTION OF THE DRAWINGS

FIG. 1A is a diagram depicting a top-view of a design for a prior periodic segmented waveguide;

FIGS. 1B-1E are diagrams depicting top-views of example designs for angled periodic segmented waveguides;

DETAILED DESCRIPTION

Figure 2A:
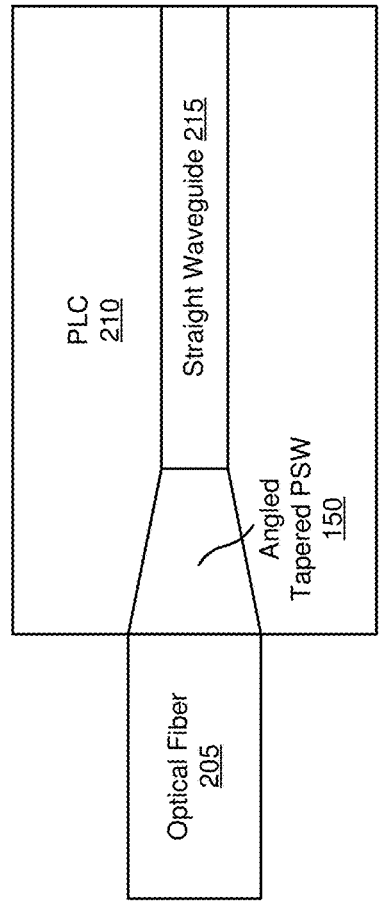
FIGS. 2A and 2B are diagrams depicting example environments in which an angled periodic segmented waveguide may be implemented.

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

A spot size converter may include a waveguide designed to expand or contract a mode of light in a spatial dimension. For example, the waveguide may be designed such that a width of the waveguide changes (e.g., incrementally, gradually), along a length of the waveguide, from a first width at an end of the waveguide to a second width at an opposite end of the waveguide (while maintaining a constant height). This causes the mode of the light to expand or contract (depending on the direction the light travels through the width-changing waveguide) in a first spatial dimension that is parallel to the width of the waveguide and perpendicular to the height of the waveguide. Such a waveguide is referred to as a tapered waveguide.

As another example, the waveguide may be designed to include a series of gaps (e.g., equally spaced, unequally spaced, of a same width, of different widths) etched in the waveguide in a direction that is perpendicular to the length of the waveguide (e.g., to create a grating-like structure). The series of gaps may include sections or areas between segments of a material that forms the waveguide (i.e., segments of PLC from which the material has been removed. In other words, the series of gaps may include sections or areas in which the material forming the PLC has been etched away. In some implementations, the series of gaps and/or the waveguide segments may be formed based on a photolithographic process.

In some implementations, an upper cladding layer (e.g., a silicon dioxide ($SiO_2$) layer) may be deposited on the segmented waveguide such that the series of gaps is filled with the upper cladding material. Here, light may pass through waveguide segments and the upper cladding material that fills the series of gaps. Alternatively, no upper cladding layer may be applied to the segmented waveguide. In such a case, light may pass through the waveguide segments and the series of gaps, where the series of gaps is filled with an atmosphere in which the segmented waveguide is located.

The series of gaps causes the mode of the light to expand or contract in a second spatial dimension that is parallel to the height of the waveguide and perpendicular to the width of the waveguide. Such a waveguide is referred to as a periodic segmented waveguide (PSW). A PSW may be termed segmented in that the waveguide comprises discrete parts: sections (e.g. waveguide segments) that mode confine light, and sections (e.g., gaps) that allow mode expansion or contraction of the light in the second spatial dimension. Such a waveguide may be termed periodic in the sense that there is a repetition of interspacing the different sections along the length of the waveguide. Notably, different sections and/or elements of a section may be equally sized or unequally sized and/or equally spaced or unequally spaced. In some implementations, the PSW may include sections with a constant width or sections with different widths.

The tapered waveguide design and the PSW design may be combined to form a tapered PSW. The tapered PSW is capable of expanding or contracting the mode of light passing through the tapered PSW in both the first and second spatial dimensions. It is advantageous to expand or contract the mode in both spatial dimensions in order to reduce mode mismatch so that light may be transmitted between a first optical component (e.g., a PLC with a first mode size) that is coupled to a second optical component (e.g., an optical fiber with a second mode size).

However, the grating-like structure of the PSW and the tapered PSW (herein collectively referred to as a prior PSW) that is created due to the series of gaps may increase an amount of return loss associated with spot size conversion (e.g., as compared to a tapered waveguide or a straight waveguide (with no taper)). The increased amount of return loss is caused by light being reflected, from each interface between a waveguide segment and a gap, back toward a light source (i.e., each segment of the prior PSW may reflect light back to the light source). Moreover, for a given prior PSW, the increase in the amount of return loss may be more significant for light that falls within a particular range of wavelengths (and corresponding ranges of wavelengths at other orders of magnitude). For example, the amount of return loss may peak at one or more wavelengths within the particular range of wavelengths.

The particular range of wavelengths within which the amount of return loss is significantly increased (i.e., includes return loss peaks) may depend on distances between, positions of, and/or sizes of gaps of the prior PSW. As such, it may be possible to design the prior PSW such that the prior PSW does not cause the return loss peaks within a wavelength range of interest, such as a wavelength range that is to be used for a particular application. In other words, the prior PSW may be designed such that the wavelength range that experiences the return loss peaks is different than the wavelength range of interest. Such a design does not reduce the amount of return loss, but merely shifts the return loss peaks to another wavelength range (e.g., a wavelength range that is not of interest for the particular application). As such, a prior PSW designed for a first wavelength range of interest may not be useful for a second wavelength range of interest (e.g., when the prior PSW is designed such that the return loss peaks fall within the second wavelength range of interest).

Implementations described herein provide a spot size converter that includes an angled PSW that reduces an amount of return loss caused by the grating-like structure of the angled PSW (e.g., as compared to a prior PSW). The angled PSW may reduce return loss across multiple ranges of wavelengths and/or may reduce return loss peaks associated with a particular range of wavelengths of the multiple ranges of wavelengths. This may allow the angled PSW to be used for a wider range of wavelengths than the prior PSW (e.g., since the return loss is reduced by the angled PSW and since the return loss peaks are reduced compared with the prior PSW). In the angled PSW, there are still return loss peaks that can be shifted in wavelength in at least the same way as in prior PSW; however, the magnitudes of those return loss peaks in the angled PSW are substantially reduce. In some implementations, the reduction in return loss at these peaks may be so substantial that the peaks may occur within the wavelengths associated with the particular application without otherwise degrading optical performance. Moreover, the angled PSW may allow spot size conversion to be performed without otherwise degrading optical performance. For example, an amount of insertion loss may not increase due to the use of the angled PSW. These features of an angled PSW allow a single angled PSW design to operate over a greater range of wavelengths than is possible with a single prior PSW design with less degradation in optical performance than is possible with a single prior PSW design.

FIG. 1A is a diagram depicting a top-view of a design for a prior PSW 100 (e.g., a tapered PSW). As shown in FIG. 1A, prior PSW 100 may have a length (e.g., L) a first width (e.g., $w_1$) at a first end and a second width (e.g., $w_2$) at a second end. Prior PSW 100 may have a constant height (not shown) in a direction perpendicular to the width and the length of prior PSW 100. As shown, prior PSW 100 may include a series of waveguide segments 105 defined by gaps 110. As shown, gaps 110 may be created (e.g., etched) such that gaps 110 are parallel to width $w_1$ and $w_2$ (e.g., such that there is a 0 degree angle between the width of prior PSW 100 and a given gap 110).

As noted in FIG. 1A and as described above, the grating-like structure of prior PSW 100 causes return losses to increase (e.g., as compared to a tapered waveguide or a straight waveguide) across a range of wavelengths (e.g., 1530 nanometers (nm) to 1620 nm) and may cause return loss peaks (e.g., up to approximately −20 decibels (dB)) for light within a particular wavelength range (e.g., 1560 nm to 1590 nm) included in the range of wavelengths. Notably, while prior PSW 100 is described as a tapered PSW, a straight (i.e., non-tapered) PSW increases return losses in a similar manner.

FIGS. 1B-1D are diagrams depicting top-views of example designs for angled tapered PSW 150. As shown in FIG. 1B, angled tapered PSW 150 may have length L, first width $w_1$ at a first end, and second width $w_2$ at a second end. Light may pass through angled tapered PSW 150 in a direction substantially parallel to length L and substantially perpendicular to widths $w_1$ and $w_2$. Angled tapered PSW 150 may have a constant height (not shown) in a direction substantially perpendicular to both the width and the length of angled tapered PSW 150. As shown, angled tapered PSW 150 may include a series of waveguide segments 155 defined by gaps 160. However, as shown, gaps 160 may be created such that gaps 160 are oriented at an angle (e.g., a) with respect to a direction of the widths (e.g., $w_1$ and $w_2$) of angled tapered PSW 150. In other words, the angle of gaps 160 may be a non-zero angle with respect to the direction of the width. Put another way, the angle of gaps 160 may be an angle that is not perpendicular to length L or a direction in which light passes via angled tapered PSW 150. In some implementations, the angle at which gaps 160 are created may be greater than 0 degrees and less than approximately 20 degrees with respect to a direction of the widths of angled tapered PSW 150.

The angled structure of gaps 160 may cause light, that would otherwise be reflected back toward the light source by each waveguide segment 155, to be directed to cladding by which angled tapered PSW 150 is surrounded. This reduces an amount of return loss associated with light passing through angled tapered PSW 150 (e.g., as compared to prior PSW 100), since less light is reflected back toward the light source.

As shown in FIG. 1B, in some implementations, angles of gaps 160 may be etched at a single relative angle (e.g., 7 degrees). In other words, all gaps 160 may be etched at an approximately same angle.

In some implementations, angles of gaps 160 may be etched at two or more different relative angles. FIG. 1C is a diagram depicting a top-view of an example design for angled tapered PSW 150 for which gaps 160 are etched at two or more different relative angles. As shown in FIG. 1C, a first set of gaps 160 may be etched at a first angle (e.g., 6 degrees), a second set of gaps 160 may be etched at a second angle (e.g., 10 degrees), and a third set of gaps 160 may be etched at a third angle (e.g., 14 degrees). As another example, a first set of gaps 160 may be etched a first angle (e.g., 9 degrees) and a second set of gaps 160 may be etched at 0 degrees (e.g., as with prior PSW 100). In other words, in some implementations, not every gap 160 may be etched at an angle.

As shown in FIGS. 1B and 1C, in some implementations, gaps 160 may be etched in a single direction within angled tapered PSW 150. For example, as shown, each gap 160 may be etched in a first direction (e.g., a left to right direction from a first side of angled tapered PSW 150 to a second side of angled tapered PSW 150).

In some implementations, gaps 160 may be oriented in two or more directions. FIG. 1D is a diagram depicting a top-view of an example design for an angled tapered PSW 150 in which gaps are etched in multiple directions. As shown in FIG. 1D, a first set of gaps 160 may be etched in the first direction (e.g., a left to right direction from the first side of angled tapered PSW 150 to the second side of angled tapered PSW 150) and a second set of gaps 160 may be etched in a second direction (e.g., a right to left direction from the first side of angled tapered PSW 150 to the second side of angled tapered PSW 150). As another example, gaps 160 may be etched in a third direction (e.g., a left to right direction from a top of angled tapered PSW 150 to a bottom of angled tapered PSW 150 (not shown)) and/or in a fourth direction (e.g., a right to left direction from the top of angled tapered PSW 150 to the bottom of angled tapered PSW 150 (not shown)). In some implementations, gaps 160 of angled tapered PSW 150 may be etched at different angles and different directions.

As noted with respect to FIGS. 1B-1D, angled gaps 160 reduce the effect of the grating-like structure of angled tapered PSW 150, thereby providing reduced return losses (e.g., as compared to prior PSW 100) across the range of wavelengths. Moreover, gaps 160 may reduce return loss peaks for light within the particular range of wavelengths (e.g., from approximately −20 dB to approximately −42 dB).

In this way, angled tapered PSW 150 may reduce an amount of return loss (e.g., as compared to a prior PSW), while providing two-dimensional mode size conversion. Moreover, angled tapered PSW 150 may be used for mode size conversion of light within at least the range of wavelengths (e.g., 1520 nm to 1630 nm), even the particular wavelength range that experienced the peak return losses. Additionally, angled tapered PSW 150 may not degrade optical performance (e.g., an amount of insertion loss may not increase due to the use of angled tapered PSW 150).

As described above, the relative angle and direction of angles, at which gaps of angled tapered PSW 150 are etched, are provided as examples. In practice, angled tapered PSW 150 may include angles of with different relative angles of angles with different directions than those shown in FIGS. 1B-1D. Additionally, or alternatively, the number, arrangement, and size of waveguide segments shown in FIGS. 1B-D are provided as examples. In practice, angled tapered PSW 150 may include additional waveguide segments, fewer waveguide segments, differently arranged waveguide segments, and/or waveguide segments of different sizes than those shown in FIGS. 1B-1D.

Notably, while the implementations illustrated in FIGS. 1B-1D illustrate tapered angled PSW 150, the features of angled tapered PSW 150 described herein may equally be applied to an angled PSW that does not taper or change in width over the length of the angled PSW. FIG. 1E is a diagram of a top-view of an example angled PSW 170 that does not taper or change in width over the length of the angled PSW. As shown in FIG. 1E, angled PSW 170 may have length L, width $w_1$ at a first end and a second end. As shown, angled PSW 170 may include a series of waveguide segments 175 defined by gaps 180, where gaps 180 may be created such that gaps 180 are oriented at angle $\alpha$ with respect to a direction of width $w_1$ of angled PSW 170.

Additionally, or alternatively, the wavelength ranges described in connection with FIGS. 1B-1D are provided as examples. In practice, angled tapered PSW 150 may reduce return losses and perform spot size conversion for light associated with a wider wavelength range, a smaller wavelength range, a different, wavelength range, or the like. For example, in addition to the conventional (C) band and the long wavelengths (L) band (i.e., 1520 nm to 1630 nm), angled tapered PSW 150 may reduce return losses and perform spot size conversion for light within the original (O) band (e.g., 1260 nm to 1360), the extended (E) band (i.e., 1360 nm to 1460 nm), the short wavelengths (S) band (e.g., 1460 nm to 1530 nm), the ultralong wavelengths (U) band (e.g., 1625 nm to 1675 nm), or the like.

Additionally, or alternatively, angled tapered PSW 150 may be used for spot size conversion for light transmission in a variety of contexts, such as an arrayed waveguide, a transmitter optical subassembly/receiver optical subassembly, a modulator, a multicast switch, or the like.

The number and arrangement of devices and components shown in FIGS. 1B-1D are provided as an example. In practice, FIGS. 1B-1D may include additional devices and/or components, fewer devices and/or components, different devices and/or components, or differently arranged devices and/or components than those shown in FIGS. 1B-1D.

Figure 2B:
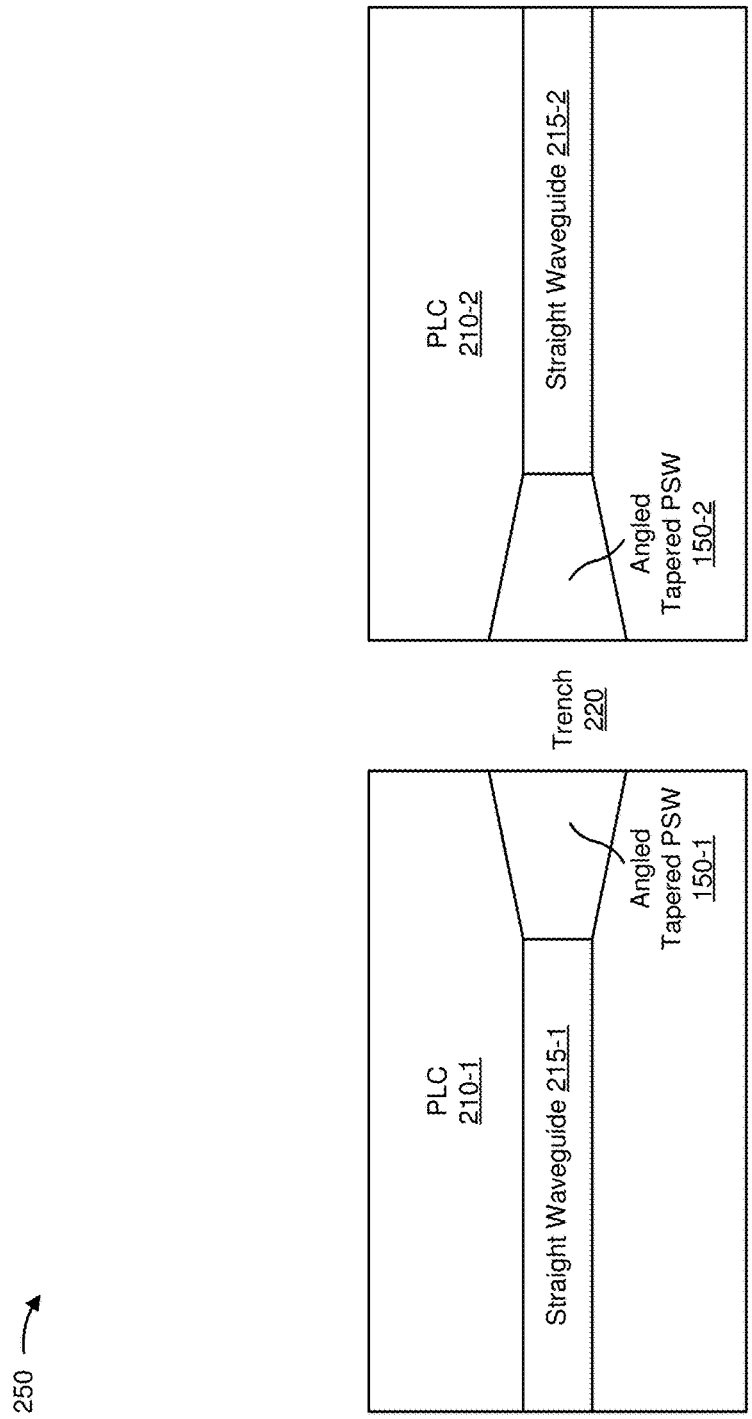

FIGS. 2A and 2B are diagrams depicting example environments 200 and 250 in which angled tapered PSW 150 may be implemented. Environment 200 is an example environment in which angled tapered PSW 150 may perform spot size conversion, associated with coupling an optical fiber to an optical device, with reduced return loss (e.g., as compared to prior PSW 100). As shown in FIG. 2A, environment 200 may include optical fiber 205 and PLC 210 that includes angled tapered PSW 150 and straight waveguide 215. Optical fiber 205 is a flexible structure for guiding light. In some implementations, an end of optical fiber 205 may be coupled to PLC 210 in order to allow light to be transmitted to and/or from PLC 210 via optical fiber 205. For example, optical fiber 205 may be coupled to angled tapered PSW 150 in order to allow light to be transmitted to and/or from a component of PLC 210 to which angled tapered PSW 150 connects, such as straight waveguide 215. In some implementations, a mode mismatch may exist between optical fiber 205 and the component of PLC 210 to which angled tapered PSW 150 connects (herein referred to as straight waveguide 215 for the purposes of FIG. 2A). For example, a mode of optical fiber 205 (e.g., 10 micrometers (µm)) may be larger than a mode of straight waveguide 215 (e.g., 5 µm, 7 µm). In such a case, spot size conversion is needed in order to efficiently transmit light between optical fiber 205 and straight waveguide 215. In some implementations, such a spot size conversion may be performed by angled tapered PSW 150, as described herein. In some implementations, multiple optical fibers 205 may be grouped in a single fiber assembly unit coupled to multiple waveguides in PLC 210.

PLC 210 is an integrated circuit capable of performing one or more optical functions. For example, PLC 210 may include an optical circuit capable of receiving and/or transmitting light. As shown, PLC 210 may include angled tapered PSW 150 and straight waveguide 215. In some implementations, PLC 210 may include a substrate layer, a lower cladding layer, and an upper cladding layer (not shown). In some implementations, angled tapered PSW 150 and straight waveguide 215 may be positioned between the lower cladding layer and the upper cladding layer of PLC 210. In some implementations, PLC 210 may include multiple angled tapered PSWs 150 and straight waveguides 215 (e.g., such that PLC 210 may be coupled to a fiber assembly unit that includes multiple optical fibers 205).

Angled tapered PSW 150 may include an angled tapered PSW used for spot size conversion of light, received and/or transmitted via PLC 210, with a reduced return loss, as described herein. Angled tapered PSW 150 is comprised of a material in which gaps 160 may be created (e.g., etched) to form a grating-like structure, and via which light may be transmitted. For example, angled tapered PSW 150 may be comprised of a silicon-based material. In some implementations, as described above, gaps 160 may include sections or areas between segments of the material that forms angled tapered PSW 150 from which the material has been removed (e.g., areas from which the material is etched away during a lithographic process). In some implementations, the material may be deposited on the lower cladding layer of PLC 210, and gaps 160 may be etched in the material to form angled tapered PSW 150. In some implementations, an upper cladding layer of PLC 210 may be deposited on angled tapered PSW 150, as described above. In some implementations, angled tapered PSW 150 may reduce and/or eliminate a mode mismatch between optical fiber 205 and a component of PLC 210 to which angled tapered PSW 150 connects, such as straight waveguide 215.

Straight waveguide 215 may include a (e.g., non-tapered, non-segmented) waveguide positioned to receive light from and/or transmit light to angled tapered PSW 150. In some implementations, straight waveguide 215 may have a different (e.g., smaller) mode than optical fiber 205 (i.e., a mode mismatch may exist between optical fiber 205 and straight waveguide 215). As such, as described above, spot size conversion is needed in order to efficiently couple optical fiber 205 to PLC 210 for transmission of light between optical fiber 205 and straight waveguide 215.

In some implementations, light may be transmitted via devices and/components of environment 200. For example, optical fiber 205 may receive light from a light source, and the light may pass through optical fiber 205 (e.g., with a mode corresponding to optical fiber 205). Angled tapered PSW 150 (included in PLC 210) may receive the light via optical fiber 205 and, as the light passes through angled tapered PSW 150, the mode of the light is contracted (e.g., in both spatial dimensions) to a (e.g., smaller) mode of straight waveguide 215.

As another example, straight waveguide 215 may receive light from a light source, and the light may pass through straight waveguide 215 (e.g., with the mode corresponding to PLC 210). Angled tapered PSW 150 may receive the light and, as the light passes through angled tapered PSW 150, the mode of the light is expanded to the (e.g., larger) mode that corresponds to optical fiber 205. As described elsewhere herein, the use of angled tapered PSW 150 in environment 200 may reduce return losses associated with the two-dimensional spot size conversion performed from optical fiber 205 to straight waveguide 215.

As shown in FIG. 2B, environment 250 is an example environment in which spot size conversion using a pair of angled tapered PSWs 150 reduces loss associated with a non-guided area (e.g., a free space, a trench) between a pair of optical devices. As shown in FIG. 2B, environment 250 may include PLC 210-1 that includes angled tapered PSW 150-1 and straight waveguide 215-1, PLC 210-2 that includes angled tapered PSW 150-2 and straight waveguide 215-2, and a trench 220 positioned between PLC 210-1 and PLC 210-2. PLC 210-1 and PLC 210-2 are optically aligned to permit light to travel from angled tapered PSW 150-1 to angled tapered PSW 150-2.

In some implementations, light may be transmitted via devices and/or components of environment 250. For example, PLC 210-1 (e.g., straight waveguide 215-1) may receive light from a light source with a mode corresponding to PLC 210-1 (e.g., straight waveguide 215-1). Angled tapered PSW 150-1 (included in PLC 210-1) may receive the light and, as the light passes through angled tapered PSW 150-1, the mode of the light is expanded (e.g., in both spatial dimensions) to a larger mode. In this example, it is advantageous to expand the mode of the light in order to reduce divergence (e.g., in both spatial dimensions) as the light travels across trench 220 (e.g., an unguided area, a free space). Here, the light may traverse trench 220, and may reach angled tapered PSW 150-2. Angled tapered PSW 150-2 (included in PLC 210-2) may receive the light and, as the light passes through angled tapered PSW 150-2, the mode of the light may be contracted (e.g., in both spatial dimensions) to a mode that corresponds to PLC 210-2 (e.g., a mode defined by straight waveguide 215-2). As described elsewhere herein, the use of angled tapered PSW 150-1 and angled tapered PSW 150-2 in environment 250 may reduce return losses associated with the two-dimensional spot size conversions performed at PLC 210-1 and PLC 210-2.

As another example, light may travel in the opposite direction with similar effect, that is, the light travels through PLC 210-2, across trench 220 and through PLC 210-1. In this example, angled tapered PSW 150-2 expands the mode of light from straight waveguide 215-2 to a larger mode for travel through the free space of trench 220, then angled tapered PSW 150-1 decreases the mode size of the light to correspond to the mode size of straight waveguide 215.1.

The number and arrangement of devices and/or components shown in FIGS. 2A and 2B are provided as examples. In practice, environments 200 and/or 250 may include additional devices and/or components, fewer devices and/or components, different devices and/or components, or differently arranged devices and/or components than those shown in FIGS. 2A and 2B. Additionally, or alternatively, a set of devices and/or components (e.g., one or more devices, one or more components) of environments 200 and/or 250 may perform one or more functions described as being performed by another set of devices and/or another set of components of environments 200 and/or 250, respectively.

Figure 3:
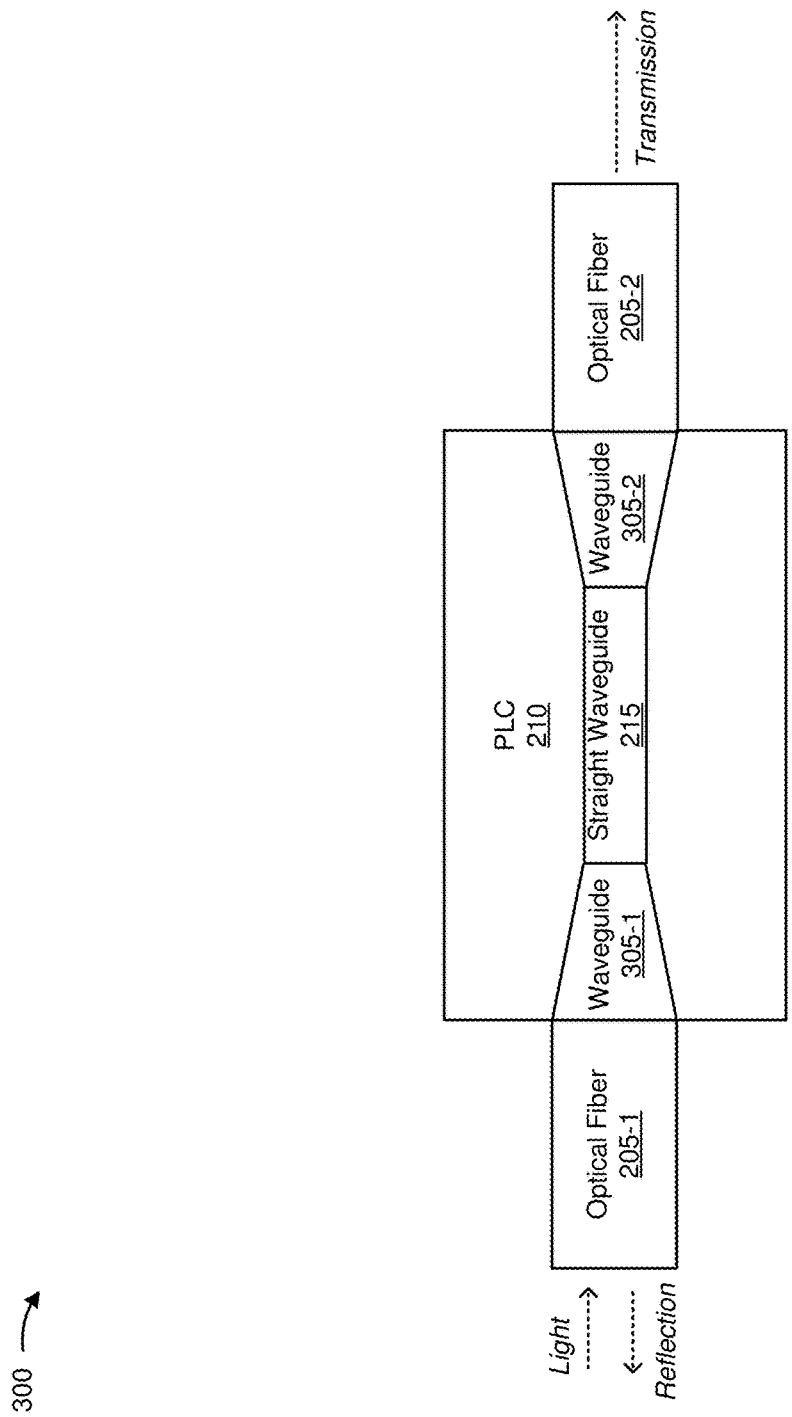
FIG. 3 is a diagram of an example implementation associated with measuring return losses and insertion losses caused by prior waveguides and various angled periodic segmented waveguides.

FIG. 3 is a diagram of an example implementation 300 that can be used to compare return losses and insertion losses associated with prior waveguides (e.g., straight waveguides, tapered waveguides, prior PSWs 100) and various angled tapered PSWs 150 whether tapered or not. As shown in FIG. 3, example implementation 300 includes optical fiber 205-1 coupled to PLC 210 at first end of PLC 210, and optical fiber 205-2 coupled to PLC 210 at a second (opposite) end of PLC 210.

As further shown, PLC 210 includes waveguide 305-1 at the first end of PLC 210. Similarly, PLC 210 includes waveguide 305-2 at the second end of PLC 210. Waveguide 305-1 and waveguide 305-2 may be prior waveguides (e.g., prior PSWs 100, straight waveguides, tapered waveguides) or angled tapered PSWs 150, as described below with regard to FIGS. 4A-4L, 5, 6A, and 6B.

As shown, PLC 210 includes straight waveguide 215 positioned between waveguide 305-1 and waveguide 305-2 (e.g., such that light may pass from waveguide 305-1 to waveguide 305-2 via straight waveguide 215, or from waveguide 305-2 to waveguide 305-1 via straight waveguide 215).

In some implementations, an amount of return loss and an amount of insertion loss may be measured based on an amount of light input (e.g., light input at optical fiber 205-1), an amount of light transmitted (e.g., light output at optical fiber 205-2), and an amount of light reflected (e.g., light reflected back toward optical fiber 205-1 from waveguide 305-1 and/or waveguide 305-2), as described below.

The number and arrangement of devices and components shown in FIG. 3 are provided as an example. In practice, example implementation 300 may include additional devices and/or components, fewer devices and/or components, different devices and/or components, or differently arranged devices and/or components than those shown in FIG. 3.

FIGS. 4A-4L are diagrams depicting return loss spectrums associated with example implementation 300 of FIG. 3. The return loss spectrums associated with FIGS. 4A-4L are determined for light passing through components of example implementation 300 with wavelengths in the C band and the L band (e.g., from 1530 nm to 1620 nm).

Differently shaded areas of FIGS. 4A-4L correspond to return loss associated with different polarizations of light. For example, the light gray areas of FIGS. 4A-4L may correspond to a first polarization of the light (e.g., a transverse-electric polarization) and the dark gray areas of FIGS. 4A-4L may correspond to a second polarization of the light (e.g., a transverse-magnetic polarization). In some implementations, return losses associated with the first polarization of light may be greater than, equal to, or less than return losses associated with the second polarization of light.

Figure 4A:
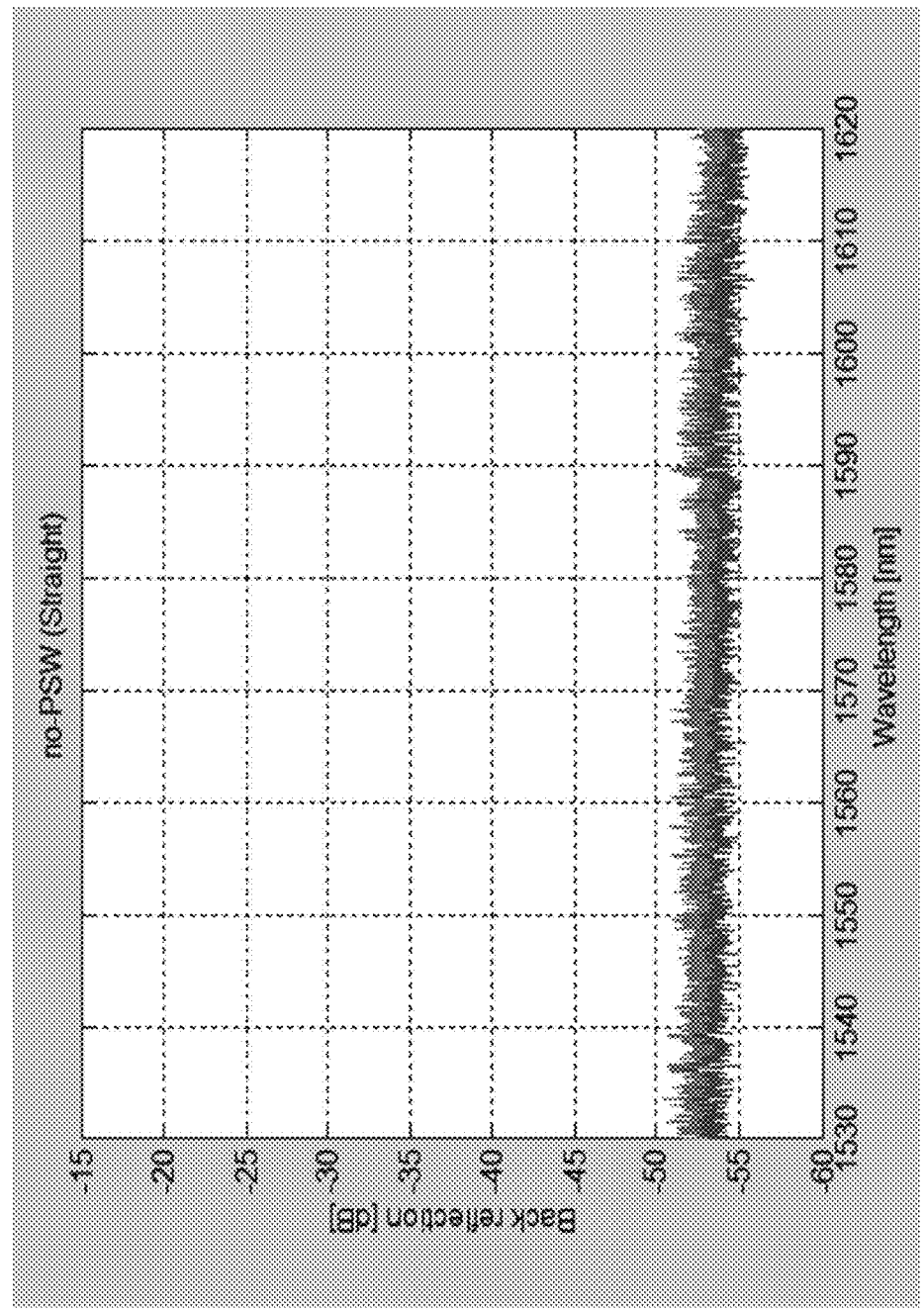
FIGS. 4A-4L are diagrams depicting return loss spectrums associated with the example implementation of FIG. 3.

For the purposes of FIG. 4A, waveguide 305-1 and waveguide 305-2 include straight (e.g., non-segmented, non-tapered) waveguides. As shown, when waveguide 305-1 and waveguide 305-2 are straight waveguides, return losses may be between approximately −50 dB and approximately −56 dB across the C band and L band. However, the straight waveguides do not provide spot size conversion (e.g., the straight waveguides do not change the mode of the light in any spatial dimension). Nonetheless, return loss spectrum 405 shown in FIG. 4A may act as a first baseline for comparing return losses caused in association with two-dimensional spot size conversion, as described below.

Figure 4B:
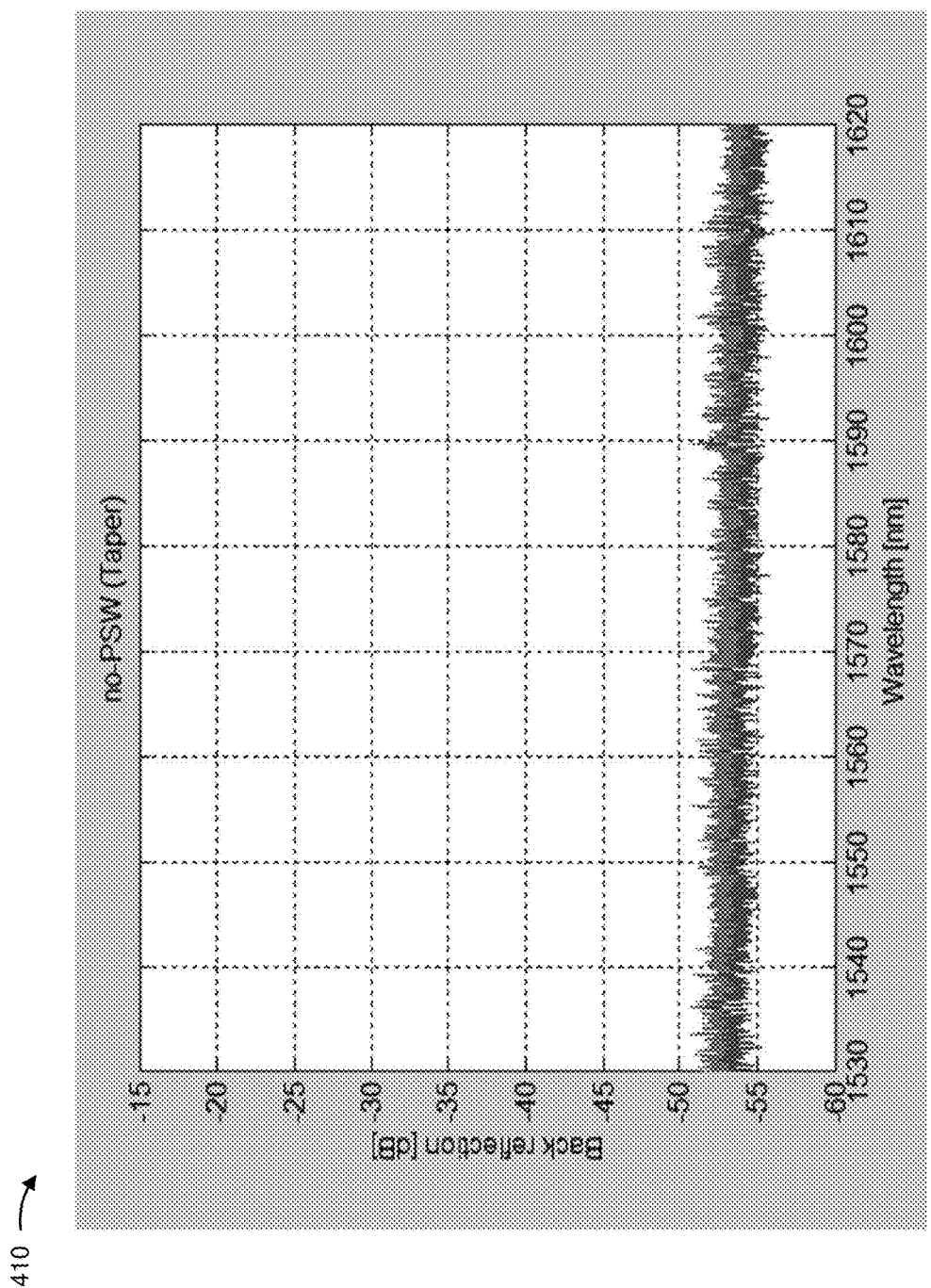

For the purposes of FIG. 4B, waveguide 305-1 and waveguide 305-2 include tapered waveguides that are not PSW (e.g. no gaps in the waveguide). As shown, when waveguide 305-1 and waveguide 305-2 are tapered waveguides, return losses may be between approximately −51 dB and −56 dB. However, the tapered waveguides provide spot size conversion in only a single spatial dimension (e.g., the spatial dimension parallel to the width of the tapered waveguides and perpendicular to the height of the tapered waveguides). Nonetheless, return loss spectrum 410 shown in FIG. 4B may act as a second baseline for comparing return losses caused in association with two-dimensional spot size conversion, as described below.

Figure 4C:
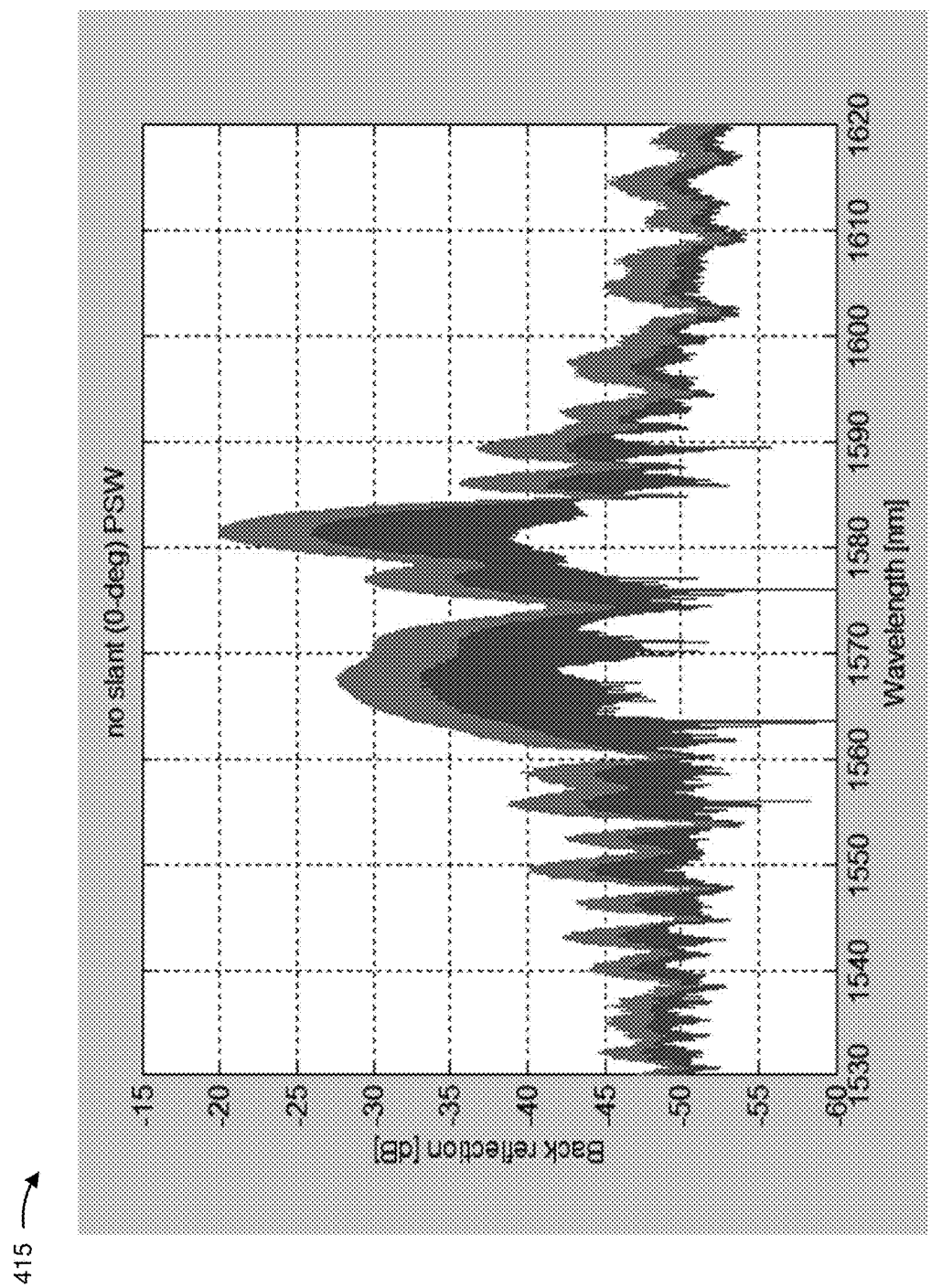

For the purposes of FIG. 4C, waveguide 305-1 and waveguide 305-2 include prior PSWs 100 (i.e., tapered PSWs with gaps etched at 0 degrees with respect to a direction of a width of prior PSW 100). As shown by return loss spectrum 415, return losses caused by prior PSWs 100 may be increased as compared to return losses associated with FIGS. 4A and 4B. In other words, return losses generally increase across the wavelength range due to the grating-like structures of prior PSWs 100, as described above in connection with FIG. 1A. Moreover, as shown, return losses are more significant (e.g., with peaks of approximately −27 dB at approximately 1568 nm and approximately −20 dB at approximately 1581 nm) within a particular wavelength range (e.g., between approximately 1560 nm and approximately 1590 nm). In other words, return losses are more significantly increased between approximately 1560 nm and approximately 1590 nm, as described above in connection with FIG. 1A. Thus, while prior PSWs 100 provide mode conversion in two spatial dimensions, return losses caused by using prior PSWs 100 may be significantly increased (e.g., as compared to return losses shown in return loss spectrums 405 and 410).

Figure 4D:
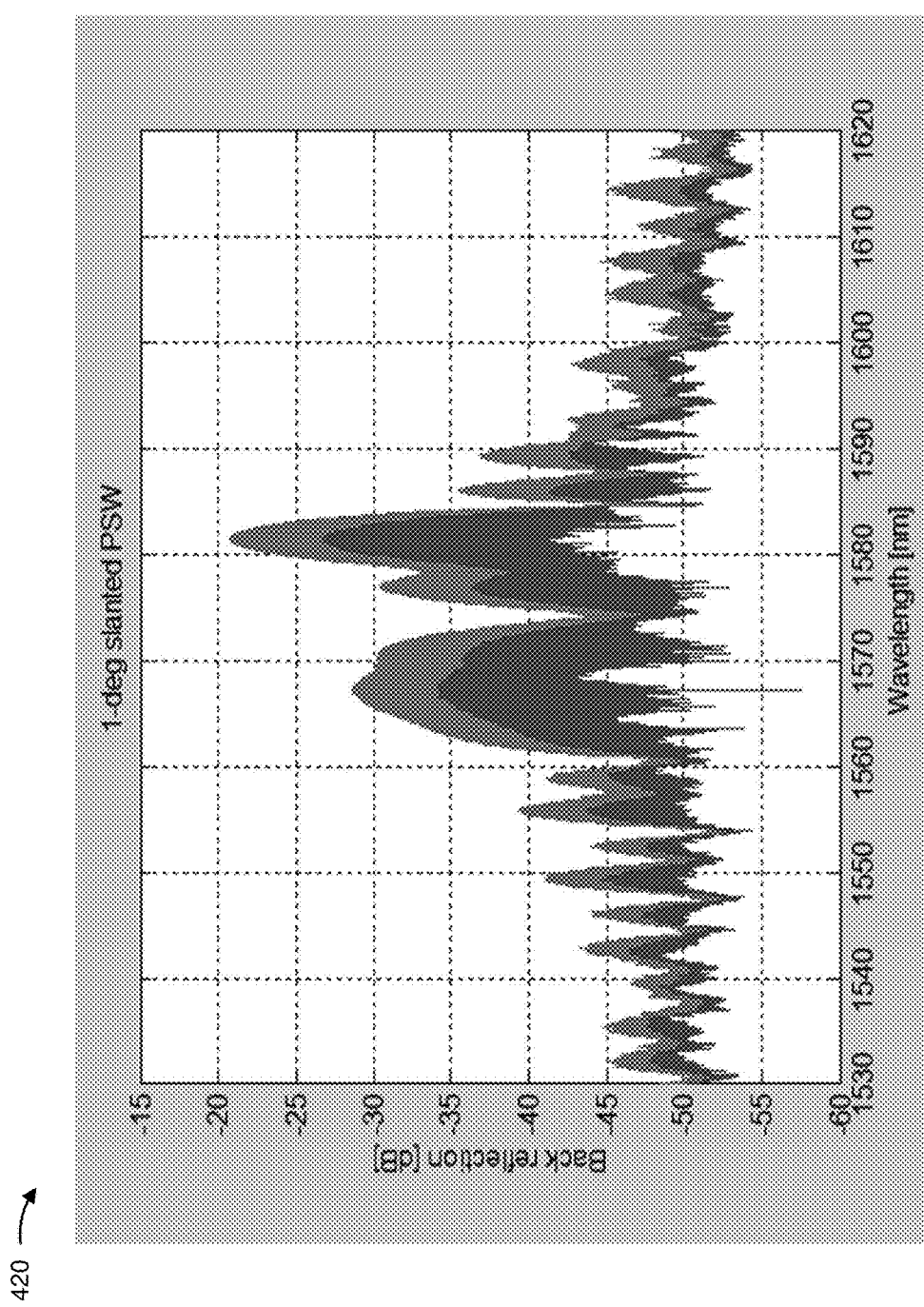

For the purposes of FIG. 4D, waveguide 305-1 and waveguide 305-2 include angled tapered PSWs 150 with gaps etched at 1 degree angles (e.g., with respect to the direction of the width of angled tapered PSW 150). As shown by return loss spectrum 420, return losses caused by the 1 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −29 dB and approximately −21 dB). In other words, the 1 degree angle at which gaps 160 are etched in angled tapered PSW 150 decreases return losses as compared to those caused by prior PSW 100, while still providing spot size conversion in two-dimensions.

Figure 4E:
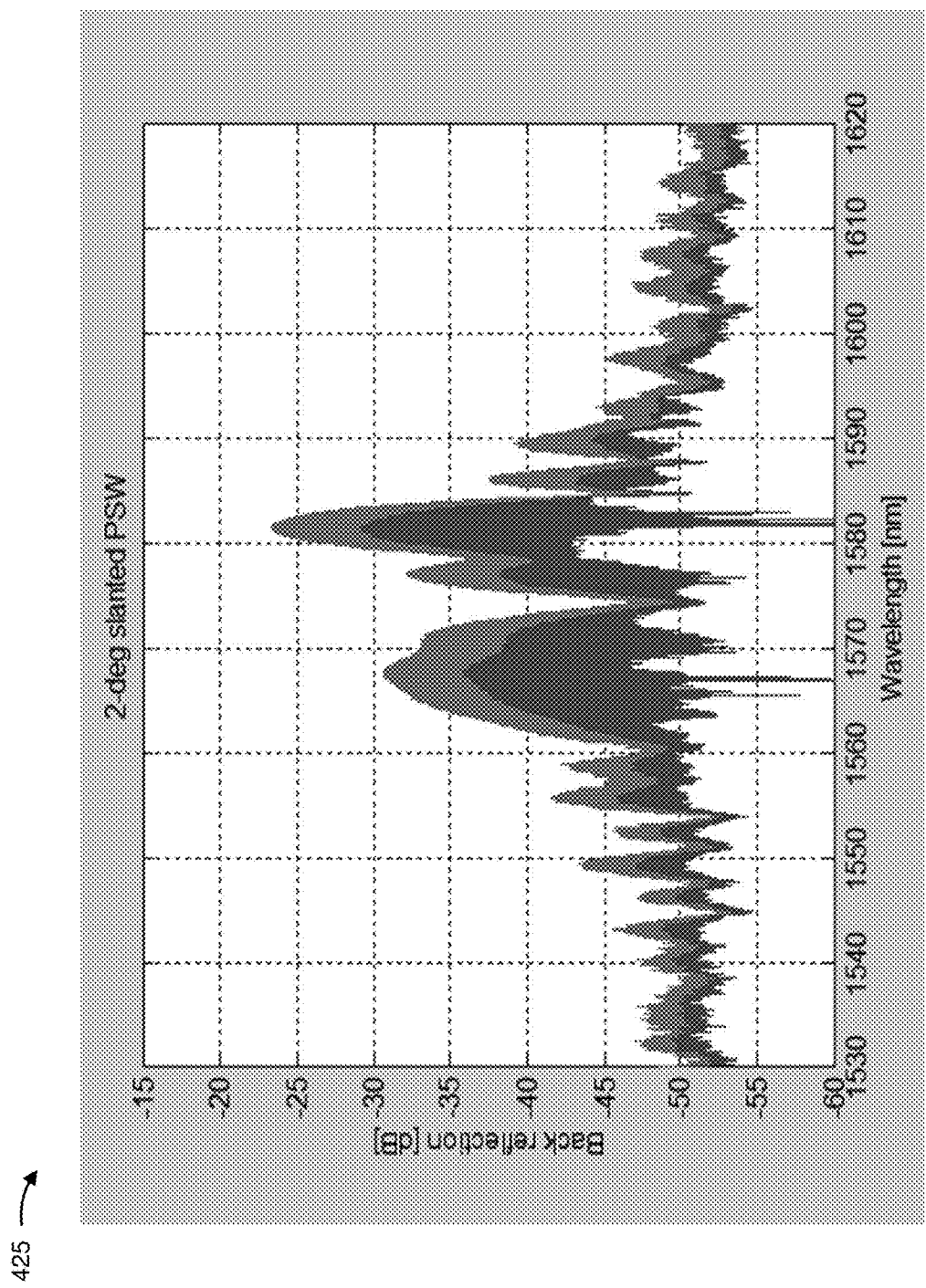

For the purposes of FIG. 4E, waveguide 305-1 and waveguide 305-2 include angled tapered PSWs 150 with gaps etched at 2 degree angles (e.g., with respect to the direction of the width of angled tapered PSW 150). As shown by return loss spectrum 425, return losses caused by the 2 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −31 dB and approximately −23 dB). In other words, the 2 degree angle at which gaps 160 are etched in angled tapered PSW 150 decreases return losses as compared to those caused by prior PSW 100, while still providing spot size conversion in two-dimensions.

Figure 4F:
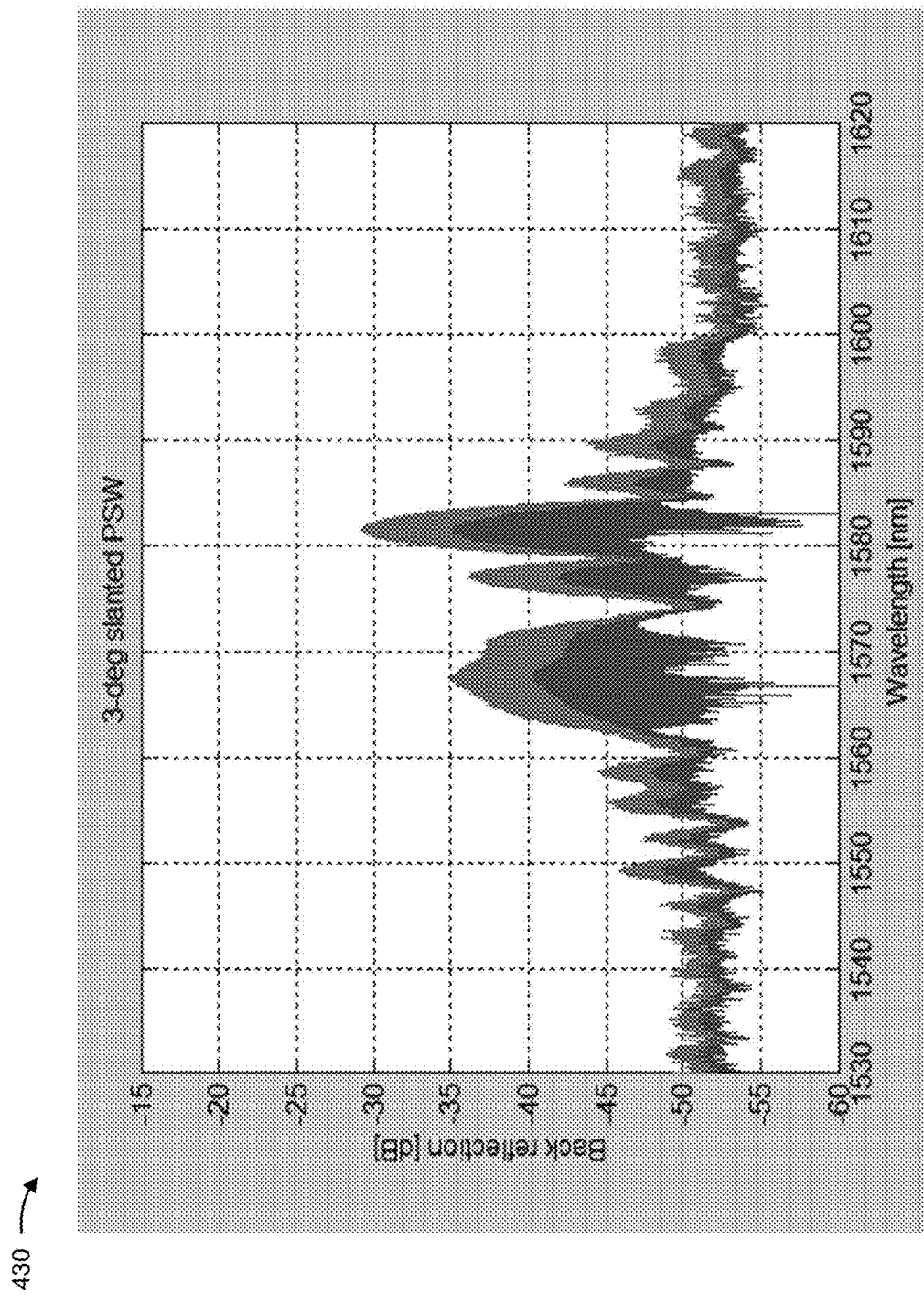

For the purposes of FIG. 4F, waveguide 305-1 and waveguide 305-2 include angled tapered PSWs 150 with gaps etched at 3 degree angles (e.g., with respect to the direction of the width of angled tapered PSW 150). As shown by return loss spectrum 430, return losses caused by the 3 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −35 dB and approximately −29 dB). In other words, the 3 degree angle at which gaps 160 are etched in angled tapered PSW 150 decreases return losses as compared to those caused by prior PSW 100, while still providing spot size conversion in two-dimensions.

Figure 4G:
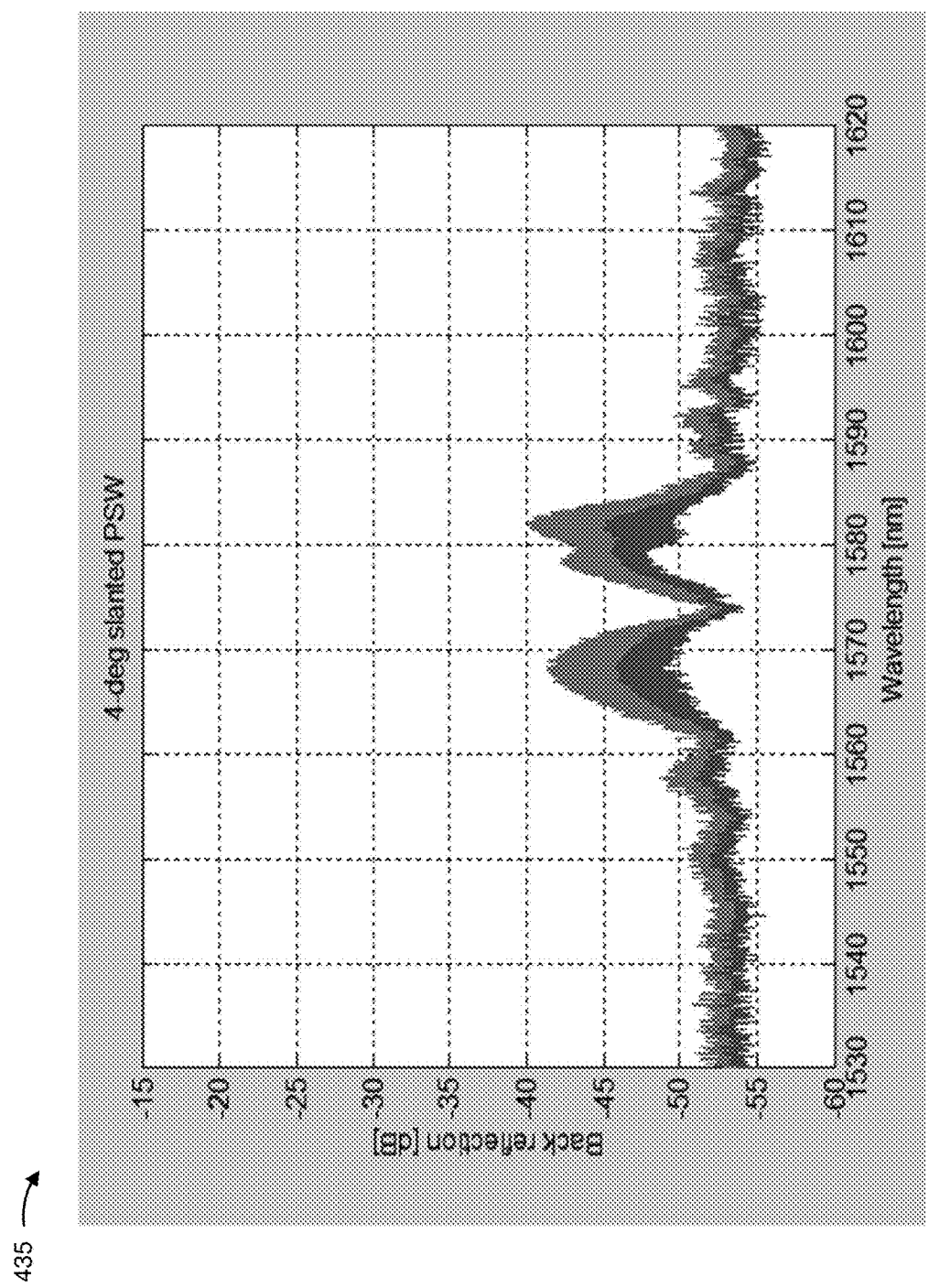

For the purposes of FIG. 4G, waveguide 305-1 and waveguide 305-2 include angled tapered PSWs 150 with gaps etched at 4 degree angles (e.g., with respect to the direction of the width of angled tapered PSW 150). As shown by return loss spectrum 435, return losses caused by the 4 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −41 dB and approximately −40 dB). In other words, the 4 degree angle at which gaps 160 are etched in angled tapered PSW 150 decreases return losses as compared to those caused by prior PSW 100, while still providing spot size conversion in two-dimensions.

Figure 4H:
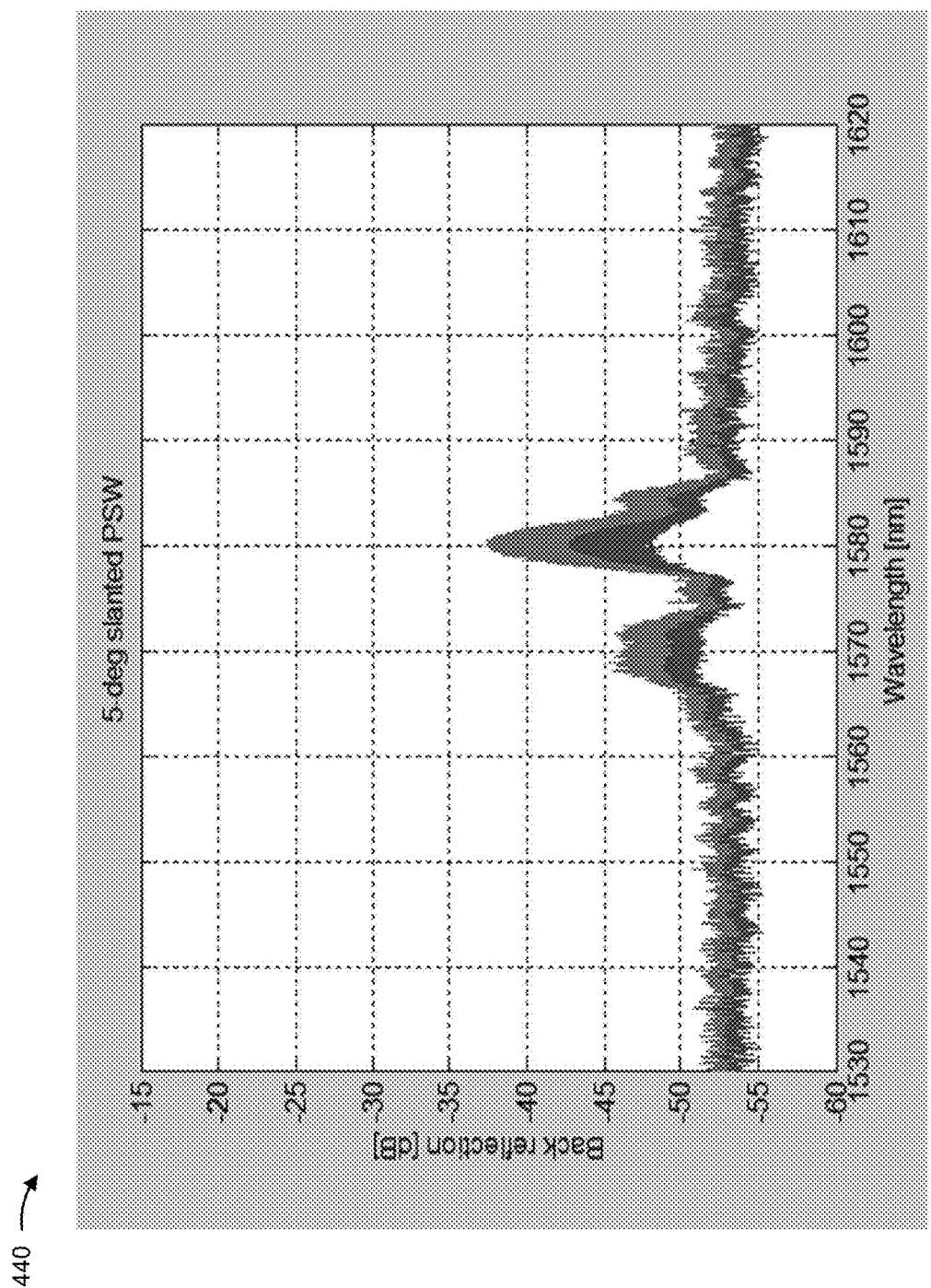

For the purposes of FIG. 4H, waveguide 305-1 and waveguide 305-2 include angled tapered PSWs 150 with gaps etched at 5 degree angles (e.g., with respect to the direction of the width of angled tapered PSW 150). As shown by return loss spectrum 440, return losses caused by the 5 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −46 dB and approximately −38 dB). In other words, the 5 degree angle at which gaps 160 are etched in angled tapered PSW 150 decreases return losses as compared to those caused by prior PSW 100, while still providing spot size conversion in two-dimensions.

Figure 4I:
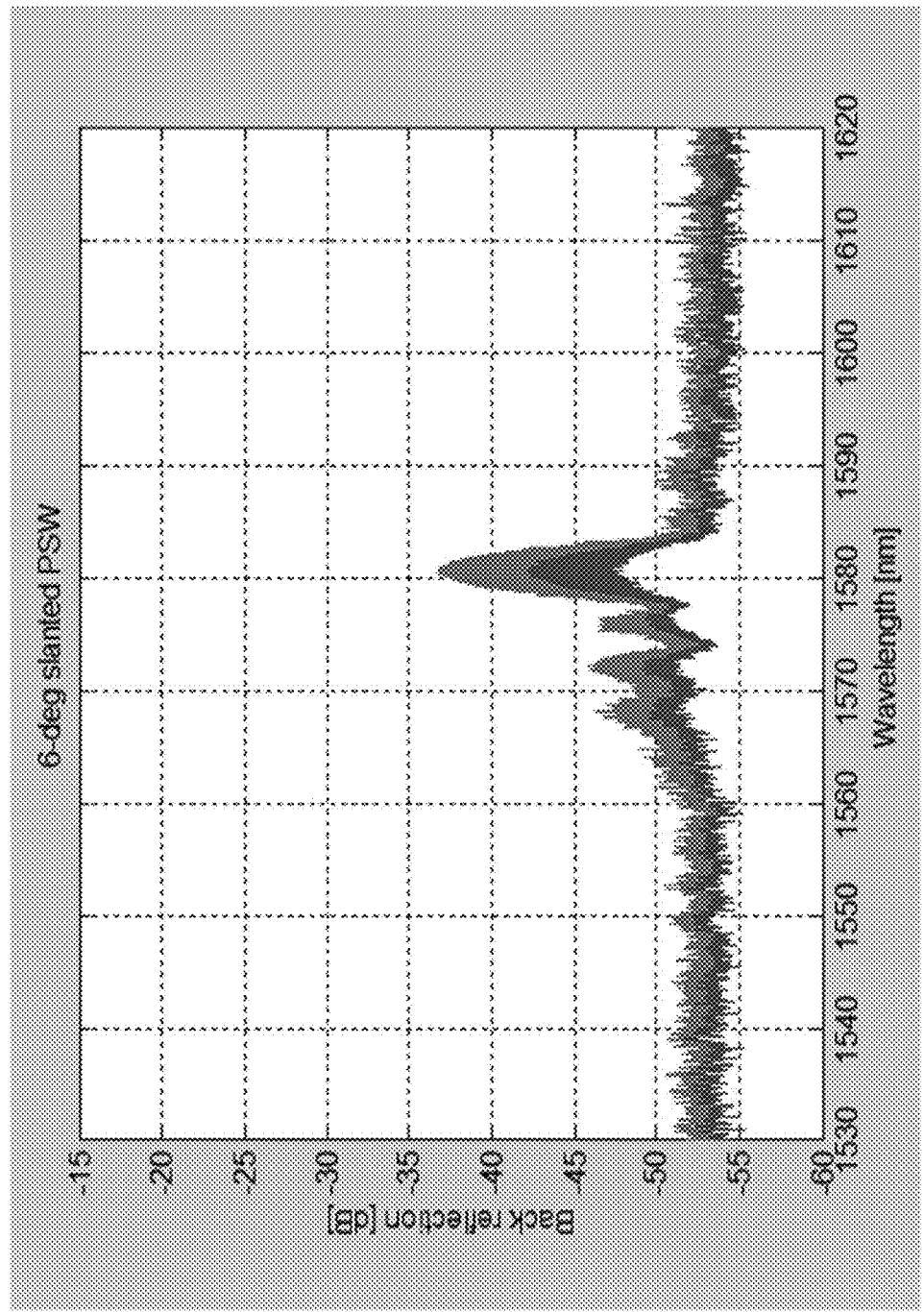

For the purposes of FIG. 4I, waveguide 305-1 and waveguide 305-2 include angled tapered PSWs 150 with gaps etched at 6 degree angles (e.g., with respect to the direction of the width of angled tapered PSW 150). As shown by return loss spectrum 445, return losses caused by the 6 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −47 dB and approximately −37 dB). In other words, the 6 degree angle at which gaps 160 are etched in angled tapered PSW 150 decreases return losses as compared to those caused by prior PSW 100, while still providing spot size conversion in two-dimensions.

Figure 4J:
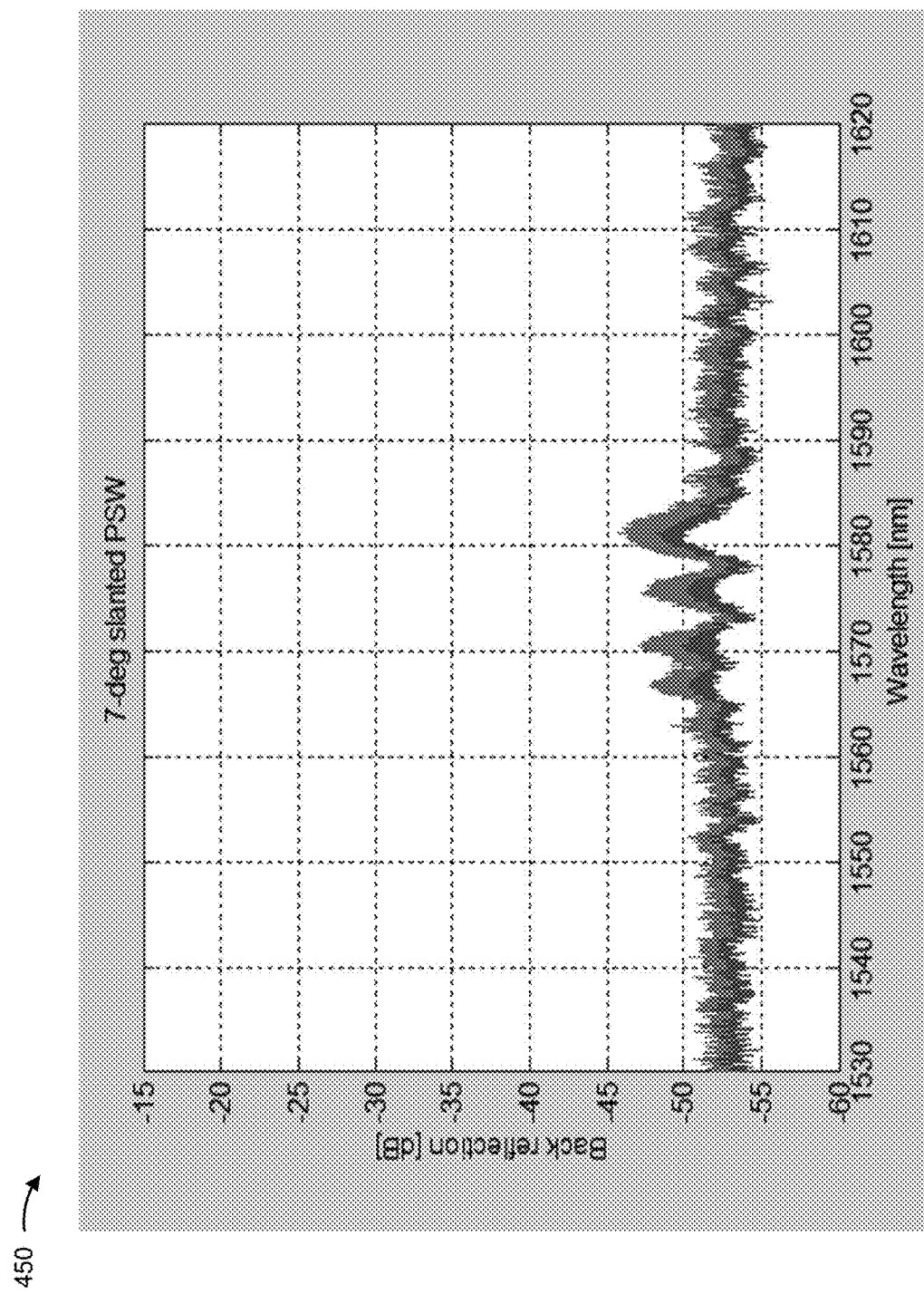

For the purposes of FIG. 4J, waveguide 305-1 and waveguide 305-2 include angled tapered PSWs 150 with gaps etched at 7 degree angles (e.g., with respect to the direction of the width of angled tapered PSW 150). As shown by return loss spectrum 450, return losses caused by the 7 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −48 dB and approximately −46 dB). In other words, the 7 degree angle at which gaps 160 are etched in angled tapered PSW 150 decreases return losses as compared to those caused by prior PSW 100, while still providing spot size conversion in two-dimensions. Moreover, the 7 degree angle may cause return losses to approach those associated with the straight waveguides and tapered waveguides, as shown in FIGS. 4A and 4B.

Figure 4K:
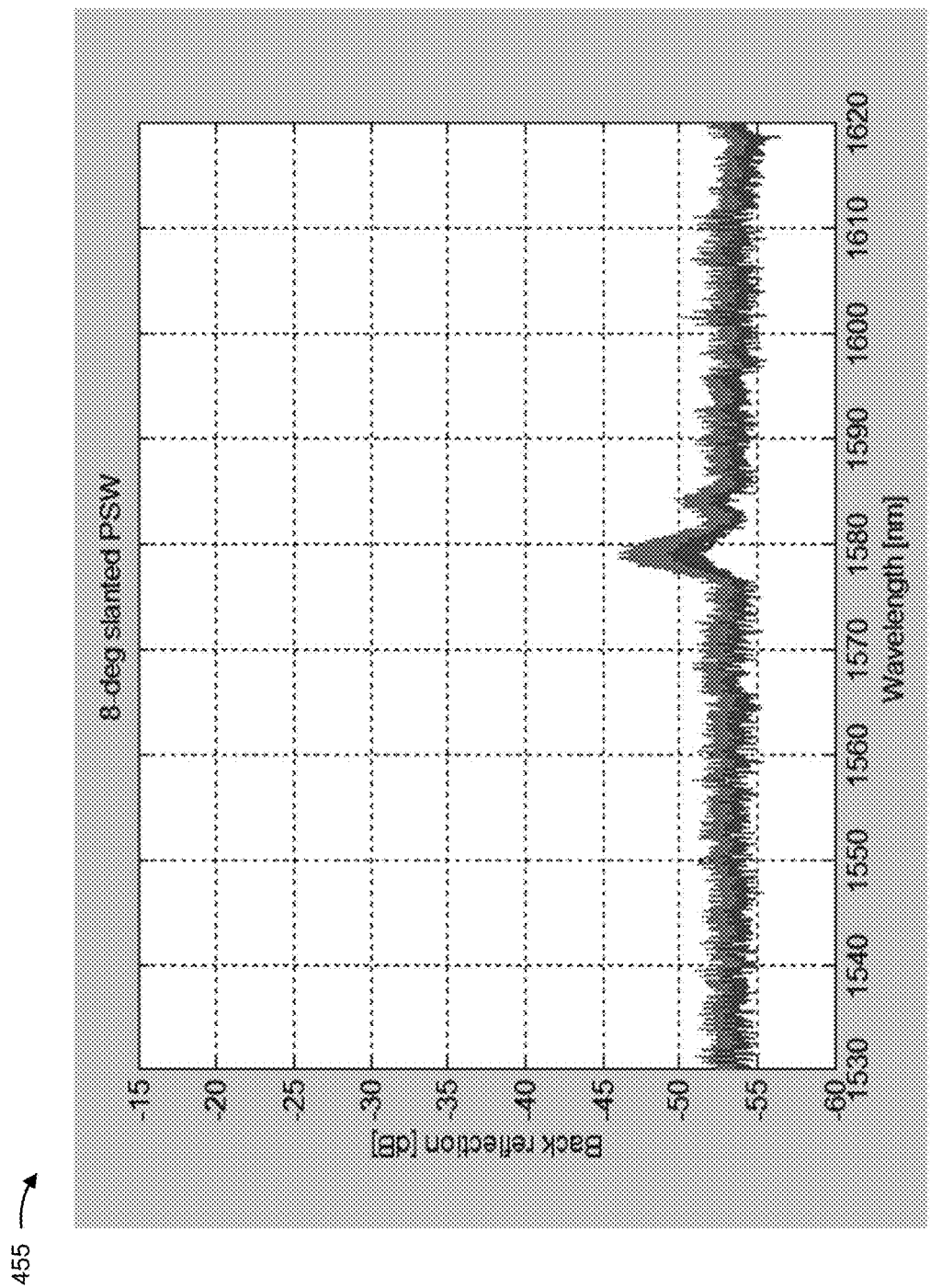

For the purposes of FIG. 4K, waveguide 305-1 and waveguide 305-2 include angled tapered PSWs 150 with gaps etched at 8 degree angles (e.g., with respect to the direction of the width of angled tapered PSW 150). As shown by return loss spectrum 455, return losses caused by the 8 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −47 dB). In other words, the 8 degree angle at which gaps 160 are etched in angled tapered PSW 150 decreases return losses as compared to those caused by prior PSW 100, while still providing spot size conversion in two-dimensions.

Figure 4L:
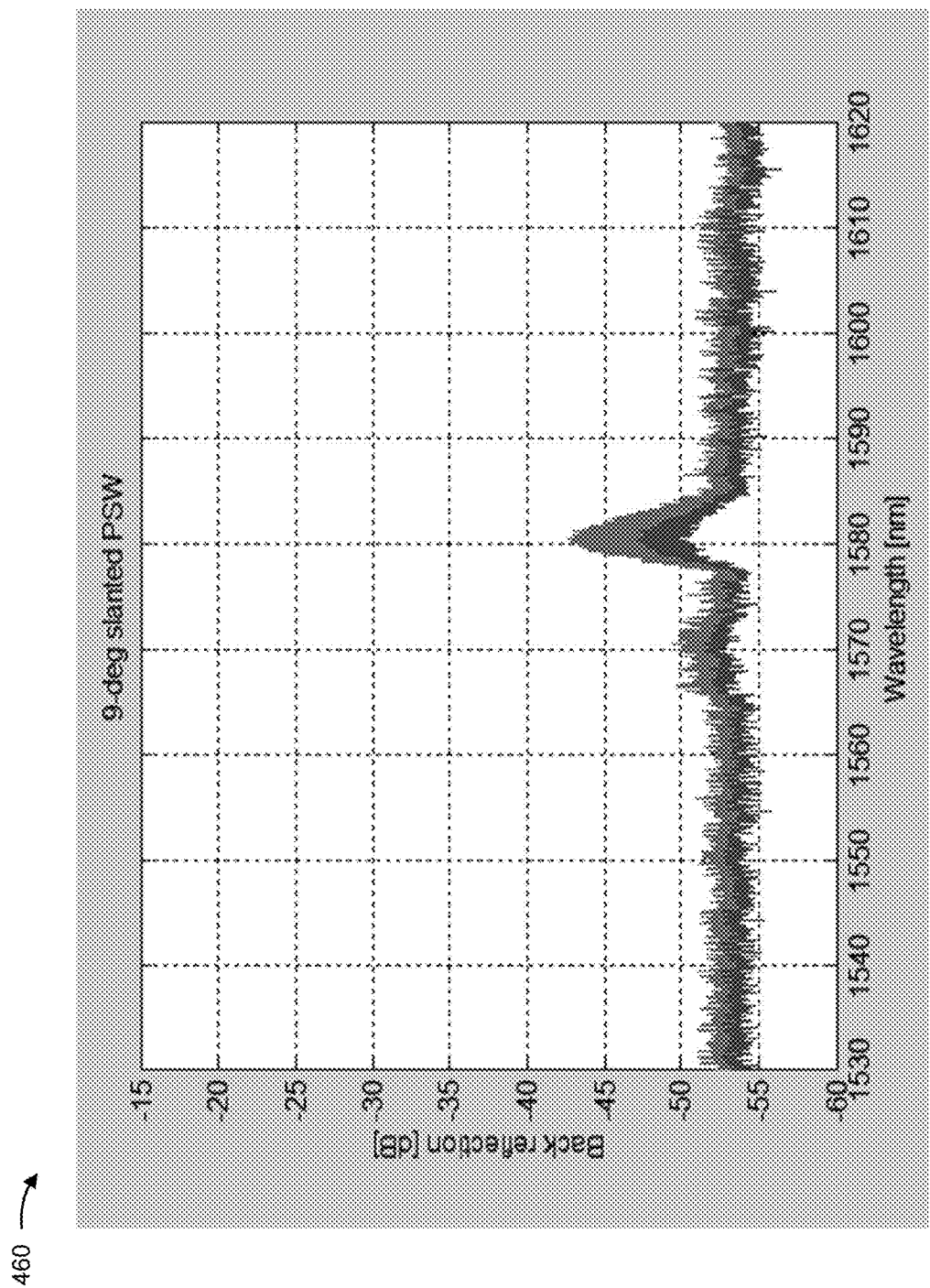

For the purposes of FIG. 4L, waveguide 305-1 and waveguide 305-2 include angled tapered PSWs 150 with gaps etched at 9 degree angles (e.g., with respect to the direction of the width of angled tapered PSW 150). As shown by return loss spectrum 460, return losses caused by the 9 degree angled tapered PSWs 150 may be decreased as compared to return loss spectrum 415 (e.g., return losses are generally lower across the wavelength range and return loss peaks between approximately 1560 nm and approximately 1590 nm are reduced to approximately −43 dB). In other words, the 9 degree angle at which gaps 160 are etched in angled tapered PSW 150 decreases return losses as compared to those caused by prior PSW 100, while still providing spot size conversion in two-dimensions.

As illustrated by FIGS. 4D-4L, return loss reduction may be improved by increasing the angle at which gaps 160 are etched in angled tapered PSW 150. For example, return loss spectrum 460 (e.g., associated with 9 degree angles) generally shows return losses similar to those shown with respect to return loss spectrum 405 (e.g., associated with the straight waveguide) and return loss spectrum 410 (e.g., associated with the tapered waveguide). It is expected that, in practice, return losses would be similarly reduced for additional angles (e.g., up to approximately 20 degrees).

Notably, return loss spectrum 460, associated with the 9 degree angled tapered PSW 150, includes a higher peak return loss (e.g., approximately −43 dB) than return loss spectrum 455 associated with the 8 degree angled tapered PSW 150 (e.g., approximately −47 dB). It is expected that, in practice, the return loss peak for the 9 degree angled tapered PSW 150 would be approximately equal to or less than −47 dB.

As indicated above, FIGS. 4A-4L are provided merely as examples. Other and/or different return loss spectrums are possible and may differ from what was described with regard to FIGS. 4A-4L. Notably, while the return loss spectrums associated with FIGS. 4A-4L are determined for light passing through components of example implementation 300 with wavelengths in that range from 1530 nm to 1620 nm (e.g., the C band and the L band), similar results are expected for other wavelength ranges, such as the O band, the E band, the S band, the U band, or the like.

Figure 5:
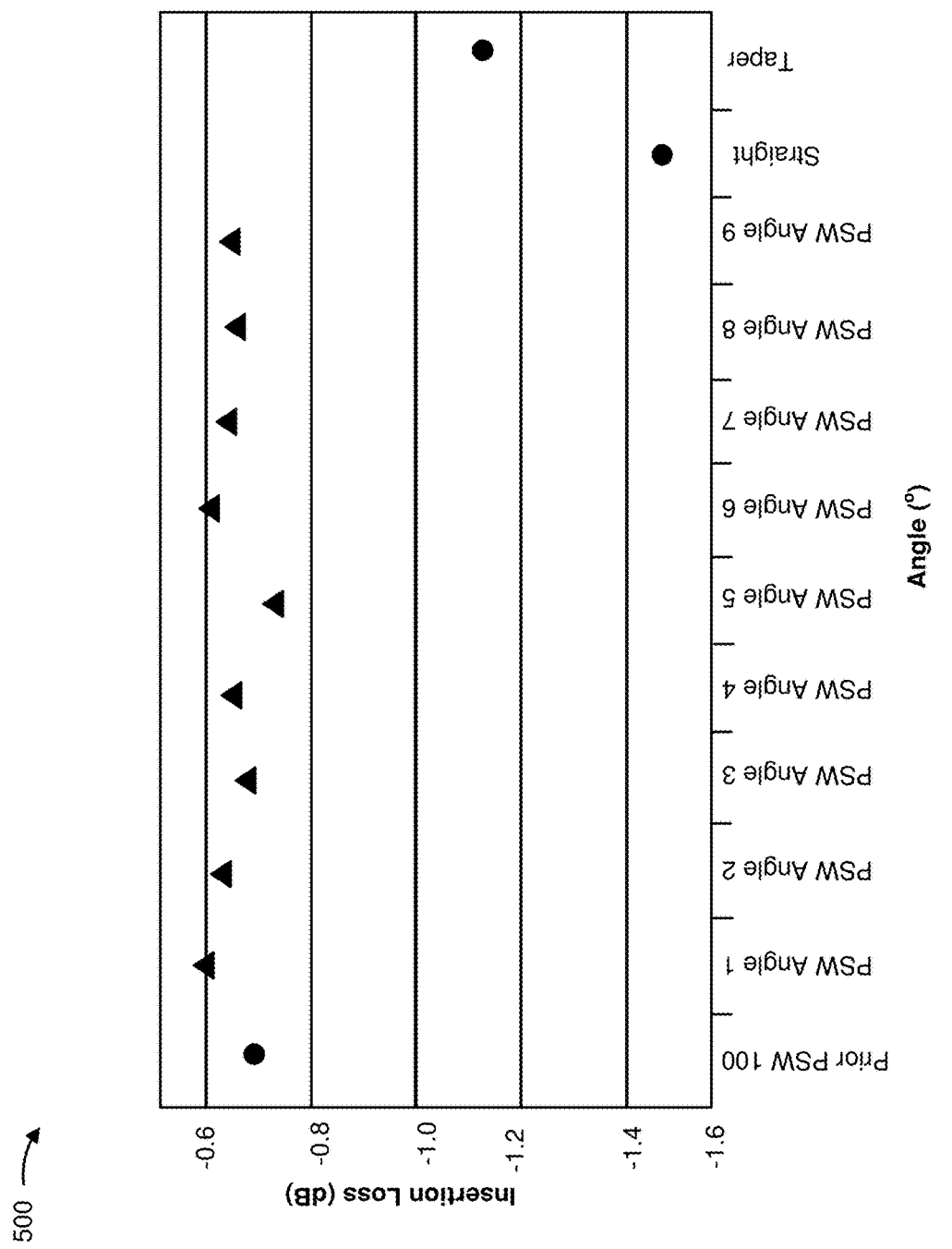
FIG. 5 is a diagram depicting insertion losses measured in association with the example implementation of FIG. 3.

FIG. 5 is a diagram depicting insertion losses that can be measured in association with example implementation 300 of FIG. 3. The insertion loss measurements associated with FIG. 5 are determined for light passing through components of example implementation 300 with wavelengths in the C band and the L band (e.g., from 1530 nm to 1620 nm).

As shown in FIG. 5, when waveguide 305-1 and waveguide 305-2 are prior PSWs 100, insertion loss may be approximately −0.69 dB. As further shown, when waveguide 305-1 and waveguide 305-2 are angled tapered PSWs 150 with angled gaps 160 from 1 degree to 9 degrees (identified by triangular symbols in FIG. 5), insertion losses may be similar or improved as compared to those caused by prior tapered PSW 100 (identified by the first circular symbol in FIG. 5). In all these cases, waveguide 305-1 and waveguide 305-2 are tapered as illustrated in FIG. 3. For example, a 1 degree angled tapered PSW 150 may cause approximately −0.58 dB of insertion loss, a 2 degree angled tapered PSW 150 may cause approximately −0.60 dB of insertion loss, a 3 degree angled tapered PSW 150 may cause approximately −0.68 dB of insertion loss, a 4 degree angled tapered PSW 150 may cause approximately −0.64 dB of insertion loss, a 5 degree angled tapered PSW 150 may cause approximately −0.72 dB of insertion loss, a 6 degree angled tapered PSW 150 may cause approximately −0.59 dB of insertion loss, a 7 degree angled tapered PSW 150 may cause approximately −0.62 dB of insertion loss, an 8 degree angled tapered PSW 150 may cause approximately −0.62 dB of insertion loss, and a 9 degree angled tapered PSW 150 may cause approximately −0.62 dB of insertion loss. As further shown, when waveguide 305-1 and waveguide 305-2 are straight waveguides without taper or PSW (e.g., without segmentation or gaps, identified as "Straight" in FIG. 5 with a circular symbol), insertion losses may be approximately −1.4 dB and, when waveguide 305-1 and waveguide 305-2 are tapered waveguides without PSW (e.g. identified as "Taper" in FIG. 5 with a circular symbol), insertions losses may be approximately −1.1 dB.

Here, insertion loss caused by the various angled tapered PSWs 150 are similar to or improved as compared to those caused by prior PSW 100. In other words, use of angled tapered PSW 150 may not degrade optical performance as compared to prior PSW 100

As indicated above, FIG. 5 is provided merely as an example. Other and/or different insertion loss measurements are possible and may differ from what was described with regard to FIG. 5. Notably, while the insertion losses associated with FIG. 5 are described for light passing through components of example implementation 300 with wavelengths in that range from 1530 nm to 1620 nm (e.g., the C band and the L band), similar results are expected for other wavelength ranges, such as the O band, the E band, the S band, the U band, or the like.

Figure 6:
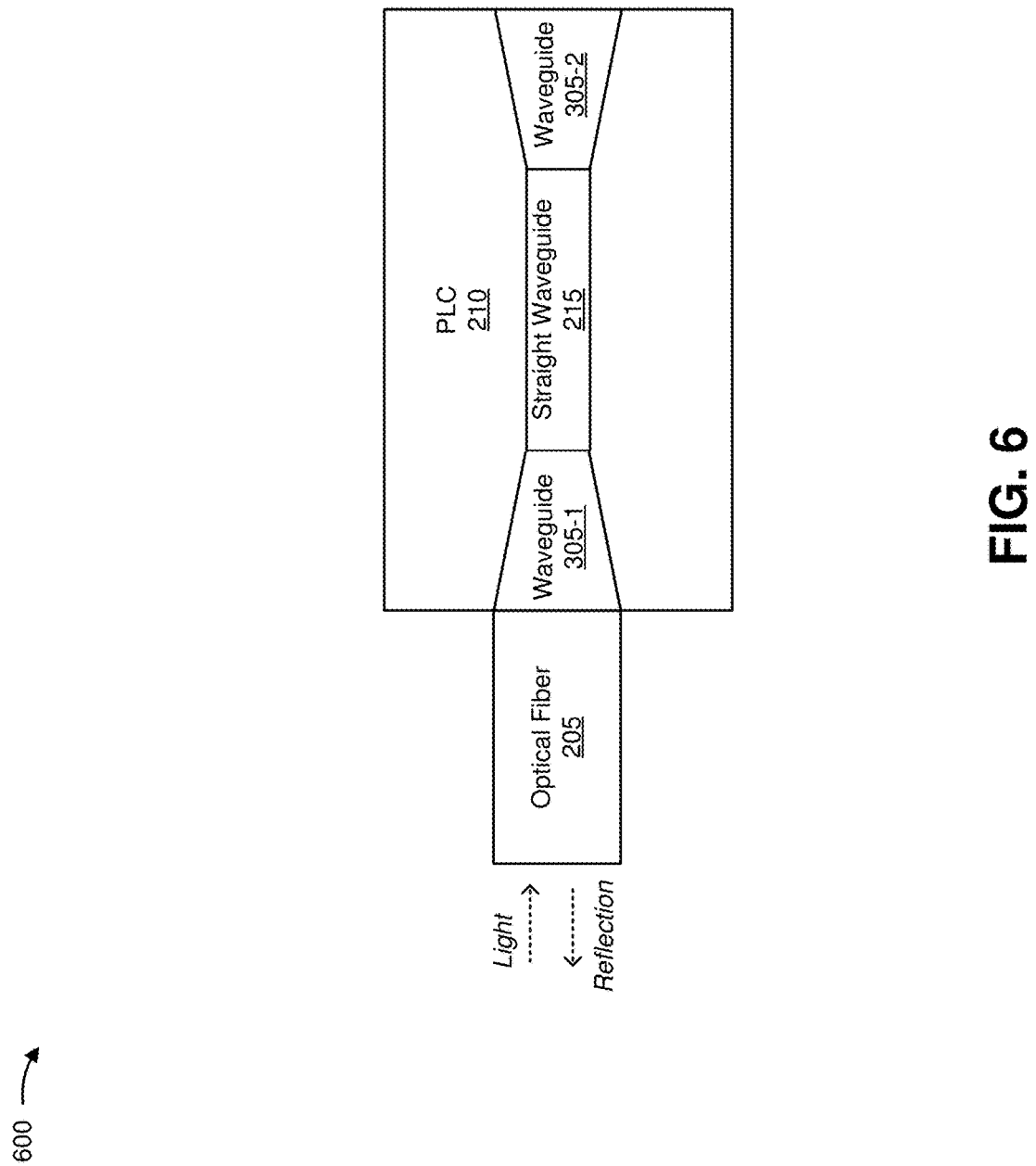
FIG. 6 is a diagram of an additional example implementation associated with measuring return losses caused by prior waveguides and various angled periodic segmented waveguides.

FIG. 6 is a diagram of an additional example implementation 600 that can be used to compare return losses associated with prior waveguides (e.g., straight waveguides, tapered waveguides, prior PSWs 100) and various angled tapered PSWs 150. As shown in FIG. 6, example implementation 600 includes optical fiber 205 coupled to PLC 210 at first end of PLC 210.

As further shown, PLC 210 includes waveguide 305-1 at the first end of PLC 210. Similarly, PLC 210 includes waveguide 305-2 at a second end of PLC 210 (at an opposite end of PLC 210). Waveguide 305-1 and waveguide 305-2 may be prior waveguides (e.g., prior PSWs 100, straight waveguides, tapered waveguides) or angled tapered PSWs 150, as described below.

As shown, PLC 210 includes straight waveguide 215 positioned between waveguide 305-1 and 305-2 (e.g., such that light may pass from waveguide 305-1 to waveguide 305-2 and from waveguide 305-2 to waveguide 305-1).

In some implementations, an amount of return loss may be measured based on an amount of light input (e.g., light input to optical fiber 205) and an amount of light reflected (e.g., light reflected back toward optical fiber 205 from waveguide 305-1 and/or waveguide 305-2), as described below.

The number and arrangement of devices and components shown in FIG. 6 are provided as an example. In practice, example implementation 600 may include additional devices and/or components, fewer devices and/or components, different devices and/or components, or differently arranged devices and/or components than those shown in FIG. 6.

Figure 7A:
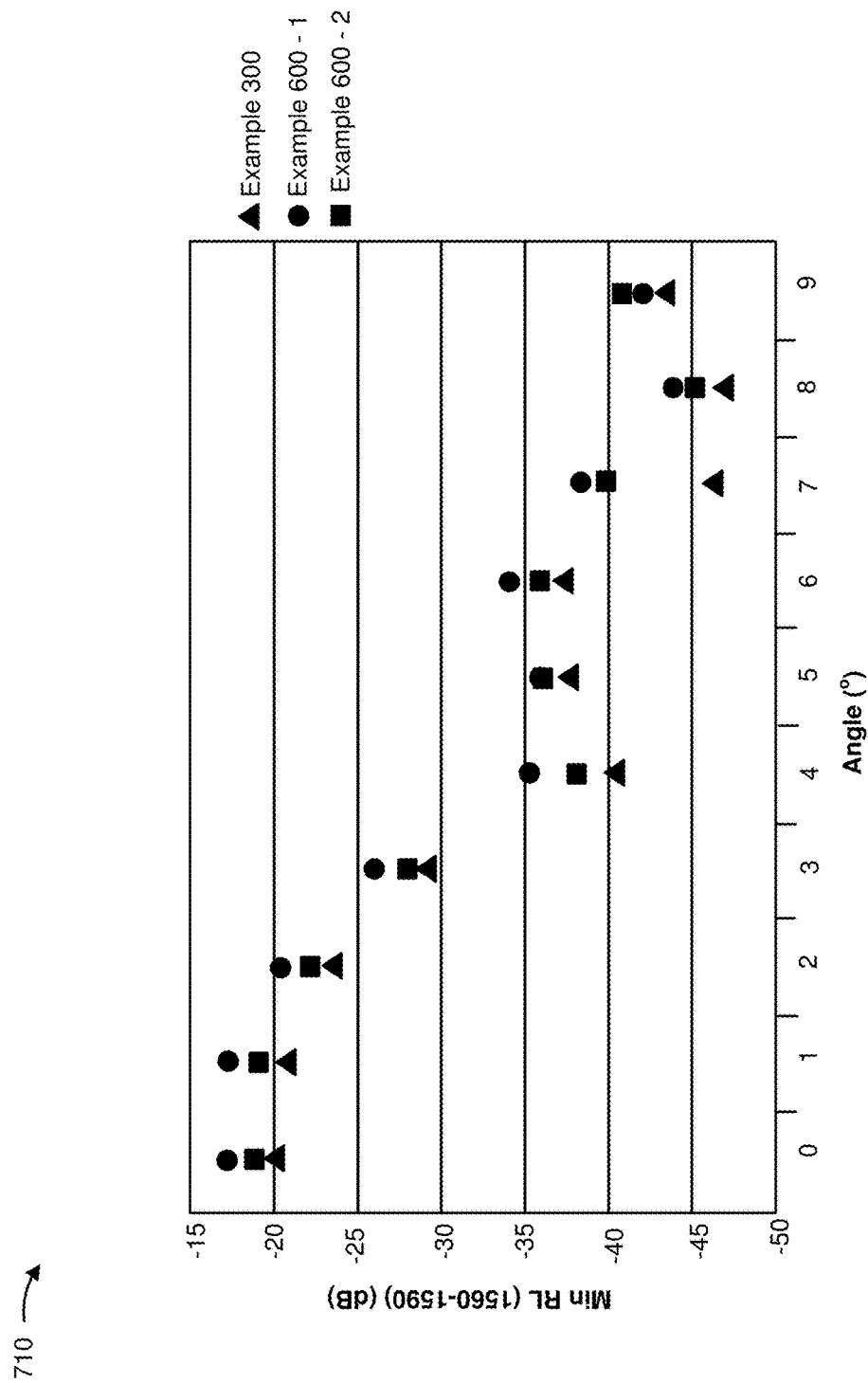
FIGS. 7A and 7B are diagrams depicting minimum return losses measured in association with the example implementations of FIGS. 3 and 6.
Figure 7B:
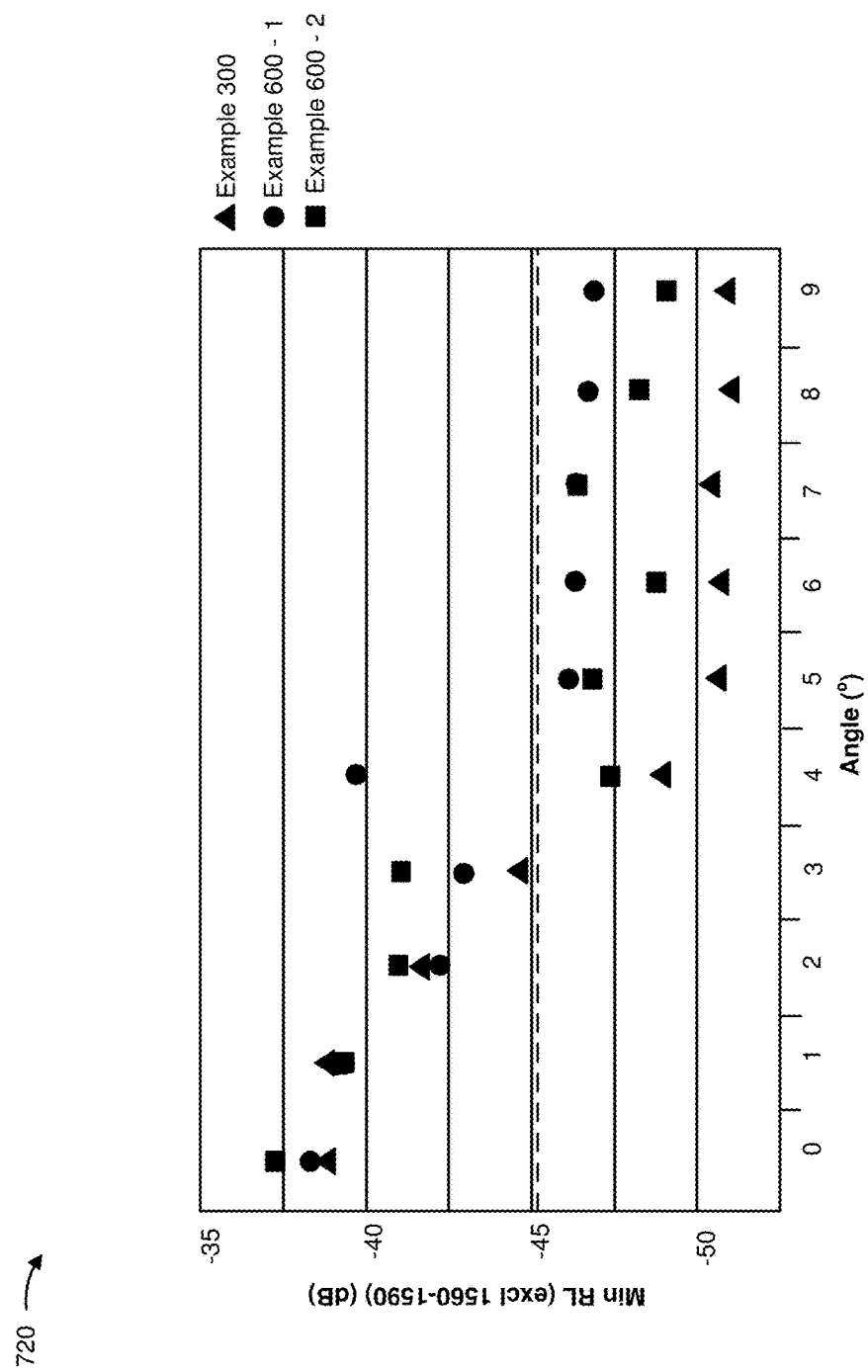

FIGS. 7A and 7B are diagrams depicting minimum return losses that may be measured in association with example implementations 300 and 600 of FIGS. 3 and 6, respectively. For the purposes of FIGS. 7A and 7B, minimum return losses are shown for light passing through an instance of example implementation 300 (identified as Example 300), a first instance of example implementation 600 (identified as Example 600-1), and a second instance of example implementation 600 (identified as Example 600-2), with wavelengths in the C band and the L band (e.g., from 1530 nm to 1620 nm).

FIG. 7A shows minimum return losses for a wavelength range of 1560 nm to 1590 nm when waveguides 305-1 and 305-2 are prior tapered PSWs 100 (e.g., with an angle of 0 degrees) and angled tapered PSWs 150 with gaps 160 angled from 1 degree to 9 degrees. Notably, the wavelength range from 1560 nm-1590 nm is the wavelength range within which return losses peaked, as described above with regard to FIGS. 4A-4L.

As shown by the triangular symbols, the return losses associated with Example 300 generally decrease as the angle of gaps 160 increases from 1 degree (e.g., approximately −21 dB) to 9 degrees (e.g., approximately −42 dB). A similar behavior is shown by the circular symbols corresponding to Example 600-1 and square symbols corresponding to Example 600-2. In other words, return losses are reduced within the particularly affected wavelength (e.g., as compared to use of prior tapered PSW 100) when angled tapered PSWs 150 are used in example implementations 300 and 600.

FIG. 7B shows minimum return losses for a wavelength range of 1530 nm to 1620 nm, excluding wavelengths ranging from 1560 nm to 1590 nm, when waveguides 305-1 and 305-2 are prior tapered PSWs 100 and angled tapered PSWs 150 with gaps 160 angled from 1 degree to 9 degrees.

As shown by the triangular symbols, the return losses associated with Example 300 generally decrease as the angle of gaps 160 increases from 1 degree (e.g., approximately −43 dB) to 9 degrees (e.g., approximately −51 dB). A similar behavior is shown by the circular symbols corresponding to Example 600-1 and square symbols corresponding to Example 600-2. In other words, return losses are generally reduced across the wavelength range (e.g., as compared to use of prior PSW tapered 100) when angled tapered PSWs 150 are used in example implementations 300 and 600.

As indicated above, FIGS. 7A and 7B are provided merely as examples. Other and/or different minimum return losses are possible and may differ from what was described with regard to FIGS. 7A and 7B. Notably, while the return losses associated with FIGS. 7A and 7B are described for light passing through components of example implementations 300 and 600 with wavelengths in that range from 1530 nm to 1620 nm (e.g., the C band and the L band), similar results are expected for other wavelength ranges, such as the O band, the E band, the S band, the U band, or the like.

Implementations described herein provide a spot size converter that includes an angled tapered PSW that reduces an amount of return loss caused by the grating-like structure of the angled PSW (e.g., as compared to a prior tapered PSW). The angled PSW may reduce return loss across multiple ranges of wavelengths and/or may reduce return loss peaks associated with a particular range of wavelengths of the multiple ranges of wavelengths. This may allow the angled PSW to be used for a wider range of wavelengths than the prior PSW (e.g., since the return loss is reduced by the angled PSW and since the return loss peaks are reduced rather than shifted as is possible with the prior PSW). Moreover, the angled PSW may allow spot size conversion to be performed without otherwise degrading optical performance. For example, an amount of insertion loss may not increase due to the use of the angled PSW.

The foregoing disclosure provides illustration and description, but is not intended to be exhaustive or to limit the implementations to the precise form disclosed. Modifications and variations are possible in light of the above disclosure or may be acquired from practice of the implementations. For example, while angled PSWs are described primarily as PLC waveguides, angled PSWs may include another type of waveguide, such as a polymer waveguide, a silicon on insulator waveguide, a silicon waveguide, a silicon nitride waveguide, an indium phosphide waveguide, an indium gallium arsenide waveguide, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A spot size converter comprising:
   a tapered periodic segmented waveguide (PSW),
   the tapered PSW including a plurality of waveguide segments defined by a plurality of gaps,
   each gap, of the plurality of gaps, being located between two waveguide segments of the plurality of waveguide segments, and
   the plurality of gaps being at one or more angles that are not substantially parallel to a direction of a width of the tapered PSW,
   the direction of the width of the tapered PSW being substantially perpendicular to a direction in which light passes through the tapered PSW, and
   the light passing from each waveguide segment, of the plurality of waveguide segments, and through each gap of the plurality of gaps.

2. The spot size converter of claim 1, where the plurality of gaps includes a first gap and a second gap and the one or more angles include a first angle and a second angle,
   the second gap being different from the first gap, and
   the second angle being different from the first angle.

3. The spot size converter of claim 2, where the first gap is oriented in a first direction relative to the direction of the width of the tapered PSW and the second gap is oriented in a second direction relative to the direction of the width of the tapered PSW,
   the second direction being different from the first direction.

4. The spot size converter of claim 1, where each of the one or more angles is greater than zero degrees and less than or equal to twenty degrees.

5. The spot size converter of claim 1, where the tapered PSW is designed to perform two-dimensional spot size conversion for light received or transmitted by the PSW.

6. The spot size converter of claim 1, where the plurality of gaps includes a first gap and a second gap and the one or more angles include a first angle and a second angle,
   the second gap being different from the first gap, and
   the second angle being the same as the first angle.

7. A periodic segmented waveguide (PSW) comprising:
   a plurality of non-curved waveguide segments defined by a plurality of gaps, and
   a gap, of the plurality of gaps, being at a non-zero angle with respect to a direction of a width of the PSW,
   the direction of the width of the PSW being substantially perpendicular to a direction in which light is configured to pass via the PSW.

8. The PSW of claim 7, where the gap is a first gap and the non-zero angle is a first non-zero angle,
   where a second gap, of the plurality of gaps, is at a second non-zero angle with respect to the direction of the width of the PSW,
   the second non-zero angle being different from the first non-zero angle.

9. The PSW of claim 7, where the non-zero angle is an angle greater than zero degrees and less than or equal to approximately twenty degrees.

10. The PSW of claim 7, where the gap is a first gap and is oriented in a first direction relative to the direction of the width of the PSW, and
    where a second gap, of the plurality of gaps, is oriented in a second direction relative to the direction of the width of the PSW,
    the second direction being different from the first direction.

11. The PSW of claim 7, where the PSW is a tapered PSW.

12. The PSW of claim 7, where one more other gaps, of the plurality of gaps, are at the non-zero angle with respect to the direction of the width of the PSW.

13. The PSW of claim 7, where the PSW is included in a planar lightwave circuit.

14. An optical device, comprising:
    a periodic segmented waveguide (PSW) including a plurality of waveguide segments defined by a plurality of gaps,
    a gap, of the plurality of gaps, being at an angle that is less than ninety degrees or greater than ninety degrees with respect to a direction of a length of the PSW, and the direction of the length of the PSW being substantially parallel to a direction in which light passes through two, opposite end faces of the PSW for spot size conversion.

15. The optical device of claim 14, where the gap is a first gap, and the angle is a first angle,
> where a second gap, of the plurality of gaps, is at a second angle that is less than ninety degrees or greater than ninety degrees with respect to the direction of the length of the PSW,
>> the second angle being different from the first angle, and
>
> where a third gap, of the plurality of gaps, is at the first angle that is less than ninety degrees or greater than ninety degrees with respect to the direction of the length of the PSW.

16. The optical device of claim 14, where the angle is greater than zero degrees with respect to a direction of a width of the PSW and less than or equal to approximately twenty degrees with respect to the direction of the width of the PSW.

17. The optical device of claim 14, where the gap is a first gap and is oriented in a first direction relative to the direction of the length of the PSW, and
> where a second gap, of the plurality of gaps, is oriented in a second direction relative to the direction of the length of the PSW,
>> the second direction being different from the first direction, and
>
> where a third gap, of the plurality of gaps, is oriented in the first direction.

18. The optical device of claim 14, where the PSW expands or contracts the light, that passes via the PSW, in a first dimension and a second dimension.

19. The optical device of claim 14, where each other gap, of the plurality of gaps, is at the angle that is less than ninety degrees or greater than ninety degrees with respect to the direction of the length of the PSW.

20. The optical device of claim 14, where an amount of return loss, associated with the light that passes through the PSW, is less than approximately −40 decibels.

* * * * *